United States Patent
Min et al.

(10) Patent No.: US 9,665,269 B2
(45) Date of Patent: May 30, 2017

(54) TOUCH INPUT APPARATUS AND VEHICLE HAVING THE SAME

(71) Applicant: HYUNDAI MOTOR COMPANY, Seoul (KR)

(72) Inventors: Jungsang Min, Seoul (KR); Jeong-Eom Lee, Yongin-si (KR); Gi Beom Hong, Bucheon-si (KR); Sihyun Joo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/950,611

(22) Filed: Nov. 24, 2015

(65) Prior Publication Data
US 2016/0320939 A1 Nov. 3, 2016

(30) Foreign Application Priority Data
Apr. 30, 2015 (KR) ........................ 10-2015-0061387

(51) Int. Cl.
*G06F 3/041* (2006.01)
*G06F 3/0488* (2013.01)
*G06F 1/16* (2006.01)
*B60K 35/00* (2006.01)
*B60K 37/06* (2006.01)

(52) U.S. Cl.
CPC ............ *G06F 3/0488* (2013.01); *B60K 35/00* (2013.01); *B60K 37/06* (2013.01); *G06F 1/16* (2013.01); *G06F 3/0416* (2013.01); *B60K 2350/102* (2013.01); *B60K 2350/1028* (2013.01); *B60K 2350/1036* (2013.01); *B60K 2350/1052* (2013.01)

(58) Field of Classification Search
USPC ........................................ 345/173
See application file for complete search history.

(56) References Cited

U.S. PATENT DOCUMENTS

| | | | |
|---|---|---|---|
| 2007/0229472 A1 | 10/2007 | Bytheway | |
| 2007/0291016 A1 | 12/2007 | Philipp | |
| 2012/0287032 A1* | 11/2012 | Olssen | G06F 3/0338 345/156 |

FOREIGN PATENT DOCUMENTS

| | | |
|---|---|---|
| JP | 2010-287223 A | 12/2010 |
| KR | 10-2007-0016096 A | 2/2007 |
| KR | 10-0767686 B1 | 10/2007 |
| KR | 10-2007-0114143 A | 11/2007 |
| KR | 10-2009-0084767 A | 8/2009 |
| KR | 10-2014-0138361 A | 12/2014 |

OTHER PUBLICATIONS

Office Action issued in corresponding Korean Patent Application No. 9-5-2016-040405185 mailed Jun. 1, 2016, 6 pgs.

* cited by examiner

*Primary Examiner* — Gustavo Polo
(74) *Attorney, Agent, or Firm* — McDermott Will & Emery LLP

(57) ABSTRACT

A touch input apparatus installed on a mounting surface includes an outer surface that rises from the mounting surface; an edge part provided at a top of the outer surface; and an inner surface that declines from the edge part, wherein the edge part is provided to receive a touch signal of a user.

18 Claims, 21 Drawing Sheets

TOUCH INPUT APPARATUS AND VEHICLE HAVING THE SAME

CROSS-REFERENCE TO RELATED APPLICATION

This application claims the benefit of priority to Korean Patent Application No. 10-2015-0061387, filed on Apr. 30, 2015 in the Korean Intellectual Property Office, the entirety of which is incorporated herein by reference.

TECHNICAL FIELD

The present disclosure relates to a touch input apparatus and a vehicle having the same, and more particularly, to a touch input apparatus capable of receiving a touch signal from a user and a vehicle having the same.

BACKGROUND

With the development of electronic communication technologies, various electronic devices have been manufactured. Electronic devices are beginning to emphasize the aesthetic quality of the design in addition to easy manipulation of the electronic device. This trend has led to a diversification of input apparatuses, including key pads.

The input apparatus is used in various display systems providing a user with information, including, for example, a portable terminal, a notebook, a smart phone, a smart pad, and a smart TV. With recent development of the electronic devices, a method of inputting a command signal may be implemented not only using a manipulation key and a dial but also using a touch input.

The touch input apparatus is an input apparatus forming an interface between an information communication device using various displays and a user, and is configured to enable an interface between an information communication device and a user through a direct contact with a touch pad or a touch screen by using a user's finger or an input tool, such as a touch pen, or by approaching the touch pad or the touch screen.

The touch input apparatus may be easily used regardless of gender or age of a user by only a contact using a finger or an input tool, such as a touch pen, so it is utilized in various devices, including Automated Teller Machines (ATM), Personal Digital Assistants (PDA) and cellular phones, and also in various fields, including banks, government offices, and for tourism and traffic direction.

In addition, there are continuous efforts to apply a touch input apparatus to heath or medical-related products and vehicles. In particular, the touch panel may be used together with a touch screen, or may be used solely in a display system, having a superior utilization. In addition, one function to input a gesture is being developed as well as a function to move a point using a touch. The touch input apparatus for inputting a gesture has been developed in a way to improve a recognition rate of a gesture.

SUMMARY

Therefore, one aspect of the present disclosure provides a touch input apparatus capable of a rolling touch input in an easy manner and provided with a superior external appearance, and a vehicle having the same.

In addition, another aspect of the present invention provides a touch input apparatus having a simple configuration, an aesthetic and unified design by omitting a dial.

In addition, another aspect of the present invention provides a touch input apparatus capable of inputting a touch signal corresponding to an intention of a user with user's eyes viewing forward or a screen, and decreasing an error rate, and a vehicle having the same In addition, another aspect of the present invention improves operation feeling or touch feeling when inputting a touch gesture.

Additional aspects of the invention will be set forth in part in the description which follows and, in part, will be obvious from the description, or may be learned by practice of the invention.

In accordance with one aspect of the present invention, a touch input apparatus installed on a mounting surface includes an outer surface, an edge part and an inner surface. The outer surface may rise from the mounting surface. The edge part may be provided at a top of the outer surface. The inner surface may decline from the edge part. The edge part may be provided to receive a touch signal of a user.

The edge part may form a closed curve.

The edge part may be provided to receive a different signal depending on a position of the edge part which makes contact with a pointer.

The edge part may be provided to receive a different signal depending on a trace connecting a start point at which a pointer makes contacts with the edge part to an end point at which the pointer is separated from the edge part.

The touch input apparatus may further include a bottom surface that extends from the inner surface and further include a touch part configured to receive a touch signal of a user.

The outer surface may be integrally formed with the mounting surface.

The edge part and the bottom surface may be each provided in a circular shape.

The inner surface may include an upper inner surface declining from the edge part and a lower inner surface connecting the inner surface to the bottom surface and having a curved surface having an inclination surface or a negative curvature.

The touch part may have a form of a concave curved surface.

The bottom surface may be movable independent of the inner surface.

The bottom surface may be provided so as to be capable of being tilted in upward, downward, leftward, and rightward directions.

The touch part may be provided at a center thereof with a center touch part and provided with an outer touch part surrounding the center touch part, and each of the center touch part and the outer touch part may independently receive a touch signal.

The center touch part may include a form of a concave curved surface.

The bottom surface may include a first bottom part on which the center touch part is provided and a second bottom part on which the outer touch part is provided. The first bottom part and the second bottom part may be movable relative to each other.

The first bottom part may be provided so as to be capable of being tilted.

The outer surface, the edge part and the inner surface may form a single structure, and the structure may be provided so as to be capable of being tilted with respect to the mounting surface.

In accordance with another aspect of the present invention, a touch input apparatus installed on a mounting surface includes a protrusion part, a recess part and a touch part. The protrusion part may be installed so as to protrude from the mounting surface in a form of a pillar. The recess part may be formed in a recess manner while including a center portion of the protrusion part, the recess part including an inner surface part connecting from a ridge part of the protrusion part to a lower side and a bottom surface connected to the inner surface part. The touch part may be provided on the bottom surface of the recess part and configured to receive a touch signal of a user. The edge part may be provided to receive a touch signal of a user.

In accordance with another aspect of the present invention, a vehicle including the touch input apparatus, a display apparatus and a control part to operate the display apparatus according to an input signal input into the touch input apparatus.

The control part may convert a gesture input into the touch input apparatus into an input signal, and transmit an operation signal such that an operation supported by the input signal is displayed on the display apparatus.

The vehicle may have the touch input apparatus installed on a gear box.

BRIEF DESCRIPTION OF THE DRAWINGS

These and/or other aspects of the invention will become apparent and more readily appreciated from the following description of the embodiments, taken in conjunction with the accompanying drawings, in which:

FIGS. 4 to 6 are diagrams illustrating manipulation of a touch input apparatus according to the first embodiment of the present disclosure, in which FIG. 4 shows a pressing input, FIG. 5 shows a swiping input, and FIG. 6 shows a character input.

DETAILED DESCRIPTION

Figure 1:
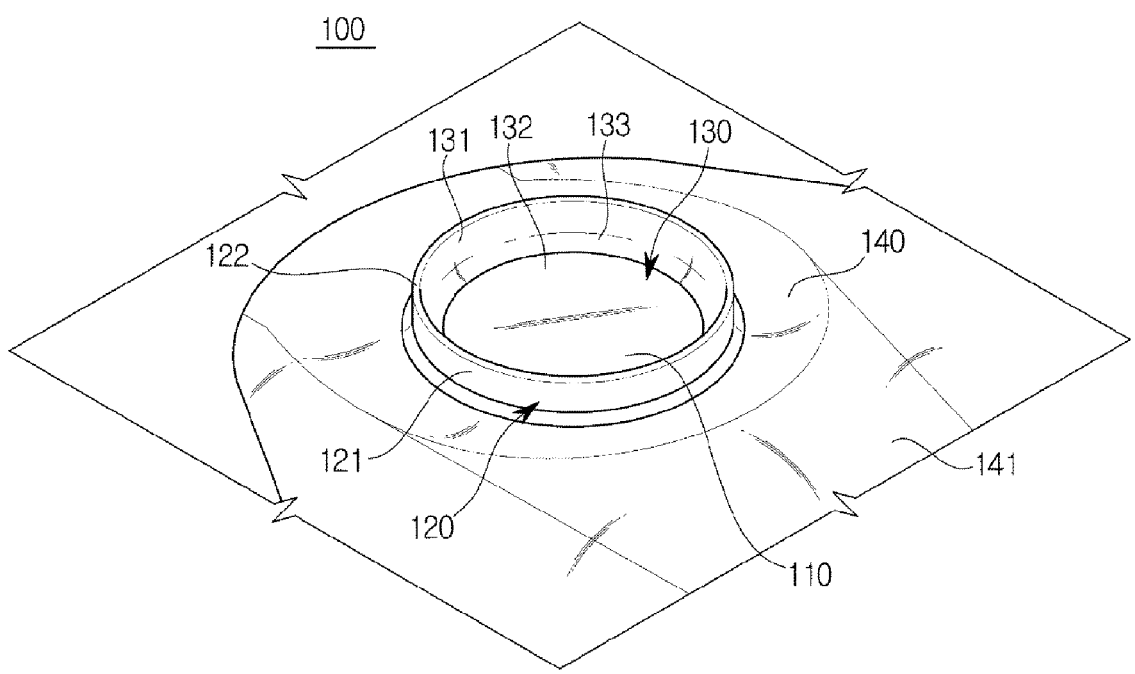
FIG. 1 is a perspective view illustrating a touch input apparatus according to the first embodiment of the present disclosure.

Embodiments of the present disclosure will be described fully with reference to the accompanying drawings. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Figure 2:
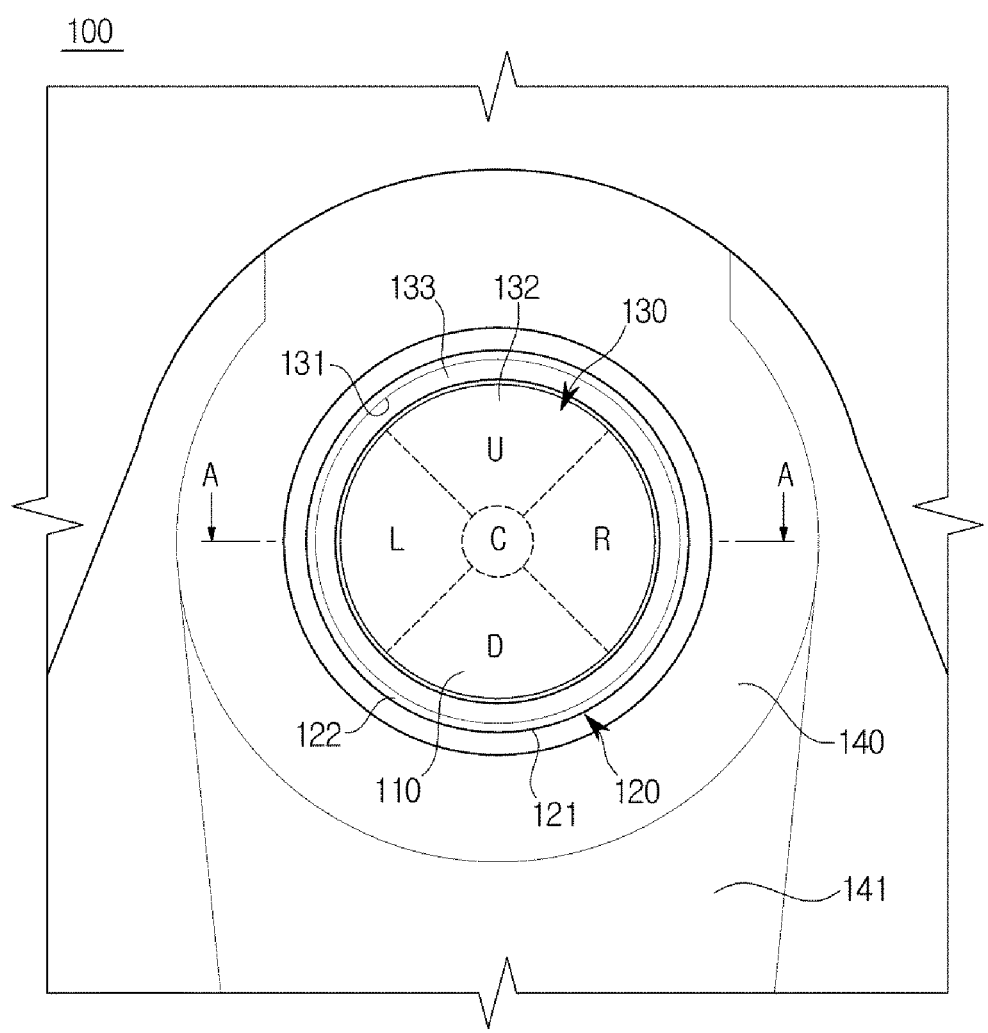
FIG. 2 is a plan view illustrating a touch input apparatus according to the first embodiment of the present disclosure.
Figure 3:
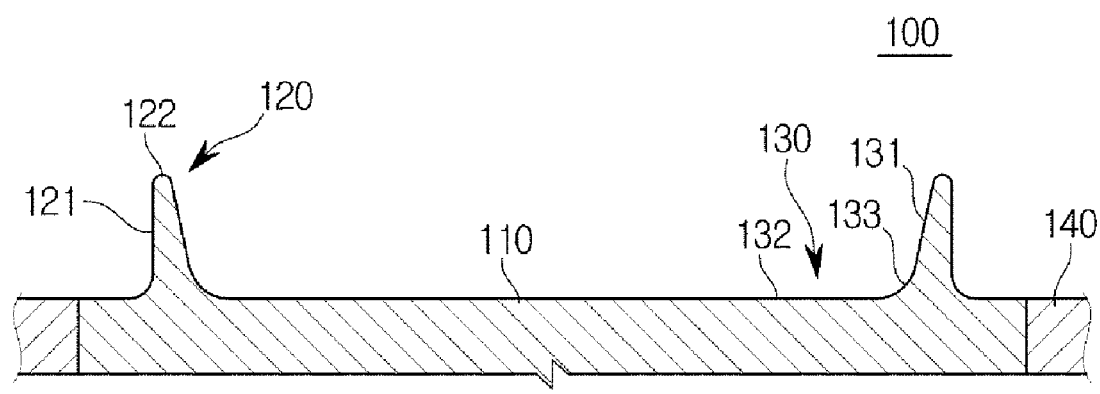
FIG. 3 is a cross-sectional view taken along line A-A of FIG. 2.

Referring to FIGS. 1 to 3, a touch input apparatus according to the first embodiment of the present disclosure will be described.

FIG. 1 is a perspective view illustrating a touch input apparatus according to the first embodiment of the present disclosure, FIG. 2 is a plan view illustrating a touch input apparatus according to the first embodiment of the present disclosure, and FIG. 3 is a cross-sectional view taken along line A-A of FIG. 2.

The touch input apparatus 100 is installed on a mounting surface 140, and includes a protrusion part 120 protruding from the mounting surface 140, a recess part 130 recessed inward of the protrusion part 120 and a touch part 110 provided on a bottom surface of the recess part 130. The protrusion part 120, the recess part 130 and the touch part 110 may be integrally formed with each other, or may be coupled to each other to form a structure.

The mounting surface 140 is provided to surround the touch input apparatus 100, and may be provided using a separate member from the touch input apparatus 10.

The mounting surface 140 is a reference surface on which the touch input apparatus 100 is installed, and may have the form of a flat surface. However, the present disclosure is not limited thereto, and the mounting surface 140 may be a convex surface or a concaved surface.

Although not shown in the drawing, an input device, such as a key button or a touch button, surrounding the touch input apparatus 100 may be positioned on the mounting surface 140. A user may input a touch signal through the touch input apparatus 100, or input a signal by using a button provided on the mounting surface 140 around the touch input apparatus 100.

The protrusion part 120 is provided to protrude from the mounting surface 140. The protrusion part 120 may have a horizontal cross section in a circular shape. For example, the protrusion part 120 may have a form of a cylinder or a circular pillar. However, the shape of the protrusion 120 is not limited thereto, and may be provided in a variety.

The protrusion part 120 includes an outer surface part 121 connected to the mounting surface 140 and a ridge part 122 connected to the outer surface part 121. For example, the drawing shows the outer surface part 121 having a cylinder shape and the ridge part 122 having a ring shape.

The recess part 130 is provided to be recessed inward of the protrusion 120 from the ridge part 122. The recess part 130 may include an opening having a circular shape whose horizontal cross section is provided in a circular shape. For example, the recess part 130 may be provided in a shape being recessed inward of the ridge part 122 of the protrusion part 120 while being opened in a circular shape.

The recess part 130 includes an inner surface part 131 connected to the ridge part 122 and a bottom part 132 on which the touch part 110 is provided. For example, the drawing shows the inner surface part 131 having a form of an inside of a cylinder and the bottom part 132 having a form of a circular plane.

In addition, the recess part 130 may include a connection part 133 connecting the inner surface part 131 to the bottom part 132. For example, the connection part 133 may be provided in a curved surface having an inclination surface or a negative curvature. The negative curvature represents a curvature formed to be concaved when the connection part 133 is viewed from outside of the recess part 130.

The bottom part 132 may include the touch part 110. The touch part 110 may receive a touch input signal of a user.

The touch part 110 may include a touch pad into which a signal is input when a pointer, such as a user's finger or a pointer, makes a contact with or approach to the touch part 110. The user may input a desired instruction or a command by inputting a predetermined touch gesture into the touch part 110.

The touch pad may include a touch film or touch sheet including a touch sensor, independent of the name thereof. In addition, the touch pad may include a touch panel that is a display apparatus capable of performing a touch on a screen.

Meanwhile, recognizing the position of a pointer when the pointer approach a touch pad without contact with the touch pad is referred to as "Proximity touch", and recognizing the position of a point when the pointer contacts with a touch pad is referred to as "Contact touch". In this case, the position according to the proximity touch represents a position of the touch pad vertical to the pointer that approaches the touch pad.

The touch pad may be implemented using a resistive method, a capacitive method, an ultrasonic method or a force sensing method. That is, the touch pad may be implemented using generally known methods.

Meanwhile, the mounting surface 140 may further include a wrist support part 141 positioned below a gesture input device to support a wrist of a user. The wrist support part 141 may be positioned to be higher than the touch part 110. Accordingly, a wrist of a user is prevented from being folded upward when a user inputs a gesture into the touch part 110 using a finger while having the wrist supported by the wrist support part 141. Accordingly, a user is prevented from having a musculoskeletal system disorder and a comfortable operating feeling may be implemented.

The configuration described above has been described such that the touch input apparatus 100 includes the protrusion part 120 installed to be protruded from the mounting surface 140 and the recess part 130 recessed from the protrusion part 120. In this case, the touch part 110 is illustrated as being provided on the bottom surface 132 that is a part of the recess part 130.

Hereinafter, another aspect of the configuration of the touch input apparatus 100 will be described.

The touch input apparatus 100 according to the first embodiment of the present disclosure includes a rising surface that rises from the mounting surface 140, an edge part provided at the top of the rising surface, a declining surface declining from the edge part and the bottom surface connected to the declining surface. In this case, the rising surface may correspond to the outer surface part of the protrusion part 120, the edge part corresponds to the ridge part 122 of the protrusion part 120, the declining surface corresponds to the inner surface part of the recess part 130 and the bottom surface corresponds to the bottom part 132 of the recess part 130. Accordingly, the same reference numbers will be used to refer to the rising surface, the edge part, the declining surface and the bottom surface as those of the outer surface part of the protrusion part, the ridge part of the protrusion part, the inner surface part of the recess part and the bottom part.

The rising surface is provided to rise from the mounting surface 140. The edge part represents connecting highest portions of the rising surface to each other. In general, the rising surface may form a closed surface surrounding an outer surface of the touch input apparatus 100, and the edge part may form a closed curve connecting peaks of the touch input apparatus 100. However, an opening may be formed at one side of the rising surface. The drawing shows the rising surface in a cylindrical shape and the edge part in a circular shape. Alternatively, one side of the rising part may be opened so that the edge part is provided similar to alphabet "C".

In addition, although the edge part is illustrated as having a uniform height, the edge part may have an uneven height. For example, the edge part may be provided to be inclined when it is viewed in a lateral direction.

In addition, the edge part may be provided to receive a touch signal of a user. The edge part may include a touch member configured to receive a signal when a pointer, such as a user's finger or a touch pen, contacts the edge part or approaches the edge part. A user may input a desired instruction or a command by inputting a predetermined touch gesture into the edge part.

The edge part may be provided to receive a different signal depending on a position of the edge part making contacting with the pointer. For example, when a pointer makes contact with an upper side of the edge part, a command allowing a cursor on a display to move upward is input, and when a pointer makes contact with a left side of the edge part, a command allowing return to a previous menu may be input.

In addition, the edge part may be provided to receive a different signal depending on a trace connecting a start point at which a pointer makes contacts with the edge part to an end point at which the pointer is separated from the edge part. For example, when the edge part is provided in a circular shape, circular icons corresponding to the edge part may be provided on a display. In this case, an icon corresponding to a position of a start point at which a pointer makes contact with the edge part is selected. When the pointer moves, the selected icon is moved according to a moving direction of the pointer. Then, an icon corresponding to a position of an end point at which the pointer is separated from the edge part may be executed. For example, circular characters corresponding to the shape of the edge part are provided on a display, and at the time when a desired character is selected by a user moving a pointer on the edge part, the contact of the pointer is released by the user so that the selected character may be input.

Alternatively, depending on the length, the direction or the angle being moved by the pointer on the edge part, a different command may be input. For example, if a pointer briefly rubs the edge part (for example, an angle equal to or smaller than 90 degrees) in a clockwise direction, the operation moves to the next menu, and if a pointer continuously rubs the edge part (for example, an angle exceeding 90 degrees) in a counterclockwise direction, the operation moves to the previous page.

The touch input apparatus 100 may include a control part configured recognize a touch input signal being input into the touch part 110, analyze the touch input signal and transmit commands to various devices.

The touch input signal may include a tap signal in which a pointer makes a contact with the touch part 110 at a predetermined position of the touch part 110 and a gesture signal in which a pointer moves while in contact with the touch part 110.

The control part, when a pointer makes a contact with a divided area of the touch part 110, recognizes the contact as a tap signal, and executes a predetermined command according to the divided area.

Referring to FIG. 2, the touch part 110 is divided into a center portion and an outer portion. For example, when the touch part 110 is provided in a circular shape, the center portion is provided as a small circle positioned inside and the outer portion is provided as a large circle except for the center portion. The touch part 110 may also be further subdivided into a smaller scale.

The outer portion of the touch part 110 may be divided into upper/lower/left and right portions. For example, the area of the touch part 110 may be divided into respective areas of 90 degrees. The area of the touch part 110 may also be divided by angles smaller than 90 degrees.

Referring to FIG. 2, the touch part 110 having a circular shape includes a center portion C provided in a small circle and outer portions U, D, L, and R. The outer portions U, D, L, and R are divided into four sections of 90 degrees along a circumference of the touch part 110. For example, the control part may execute a command to select a menu where a cursor is positioned when a pointer taps the center portion C, and may execute a command to move a cursor on a screen upper/lower/left and right sides when a pointer taps of the outer portions U, D, L, and R.

Meanwhile, the dividing of the touch region of the touch part 110 may be visually displayed. For example, the outer portions U, D, L, and R may be indicated as arrows, and the center portion C may be represented in a color different from those of the outer portions U, D, L, and R. Alternatively, an LED light may be installed at only one of the center portion C and the outer portions U, D, L, and R to be illuminated.

Alternatively, the dividing of the touch region of the touch part 110 may not be visually represented. In this case, when a user touches a center area of the touch part 110, it is recognized that the center portion C is touched, and when a user touches a upper area of the touch part 110, it is recognized that the upper portion C is touched.

Alternatively, the dividing of the touch region of the touch part 110 may be provided in a tactile manner. The center portion C of the touch part 110 may have a roughness different from those of the outer portions U, D, L, and R, or may have a temperature different from those of the outer portions U, D, L, and R.

The control part recognizes a gesture signal when a pointer moves while making contact with the touch part 110, recognizes the shape of a gesture by tracing movement of the pointer, and executes a predetermined command according to a shape of the gesture.

For example, the control part may move a cursor or a menu on a display according to a trace of movement of a pointer on the touch part 110. That is, when a pointer moves from an upper side to a lower side, a cursor may be moved from an upper side to a lower side, or a previously selected menu may be moved from an upper menu to a lower menu.

In addition, the control part may analyze a trace of movement of a pointer to map the analyzed result to a predetermined gesture, and execute a command defined by the gesture. When a pointer performs an operation, such as flicking, swiping, rolling, circling, spinning, or tapping, the control part recognizes the operation and executes a command corresponding to the recognition. Alternatively, a user may input a gesture by using various touch input schemes.

In this case, the flicking or the swiping may represent a touch input scheme in which a pointer is moved in one direction while in a contact with the touch part 110 and then the contact is released, the rolling may represent a touch input scheme in which an arc is made around the center of the touch part 110, the circling or the spin may represent a touch input scheme in which a circle is made around the center of the touch part 110, and the tapping may represent a touch input scheme in which the touch part 110 is tapped. The tapping may include a multi-tap scheme of repeatedly tapping the touch part 110.

In addition, a user may input a gesture by using a multi pointer input scheme. The multi pointer input scheme represents a scheme of inputting a gesture in a state that two pointers simultaneously or sequentially contact with the touch part 110. For example, a user may input a gesture in a state that two fingers touch the touch part 110. A user may input a gesture using a multi pointer input scheme in addition to a single pointer input scheme, thereby delivering various commands.

In addition, a user may input a gesture by drawing characters, numbers or designated symbols. For example, a character of Korean, English, or other alphabets, or Arabic numbers or mathematical operators may be drawn. A user may directly input a desired character or number, so that input time is reduced and an intuitive interface is provided.

The touch part 110 provided on the bottom part 132 has been described above. However, the touch part 110 may be provided at various positions of the protrusion part 120 and the recess part 130. As the mounting positions of the touch part 110 are diversified, more various commands may be input.

The protrusion part 120 may be provided to perform a touch input. For example, a user may input a touch signal through an operation of rotating the outer surface part 121 of the protrusion part 120 while gripping the outer surface part 121 of the protrusion part 120. In this case, the protrusion part 120, which is fixed to the mounting surface 140, may not actually physically rotate, but the control part may recognize that a user's hand (an example of a pointer) is slid while in contact with the outer surface part 121.

The configuration of the outer surface part 121 performing a touch input corresponds to a dial input. A dial is mounted on a knob, and is configured to be physically rotated so that the dial may serve to adjust a volume, and the like, according to a degree of rotation. When the outer surface part 121 of the protrusion 120 is configured to perform a touch input according to the embodiment of the present disclosure, a user may obtain the same result as manipulation of a dial by rotating the outer surface part 121 while gripping the outer surface part 121.

Alternatively, the ridge part 122 of the protrusion part 120 may be provided to perform a touch input. In this case, a user may input a rolling gesture by making a circle along the ridge part 122 while in contact with the ridge 122.

Alternatively, the inner surface part 131 or the connection part 133 of the recess part 130 may be provided to perform touch input.

Figure 4:
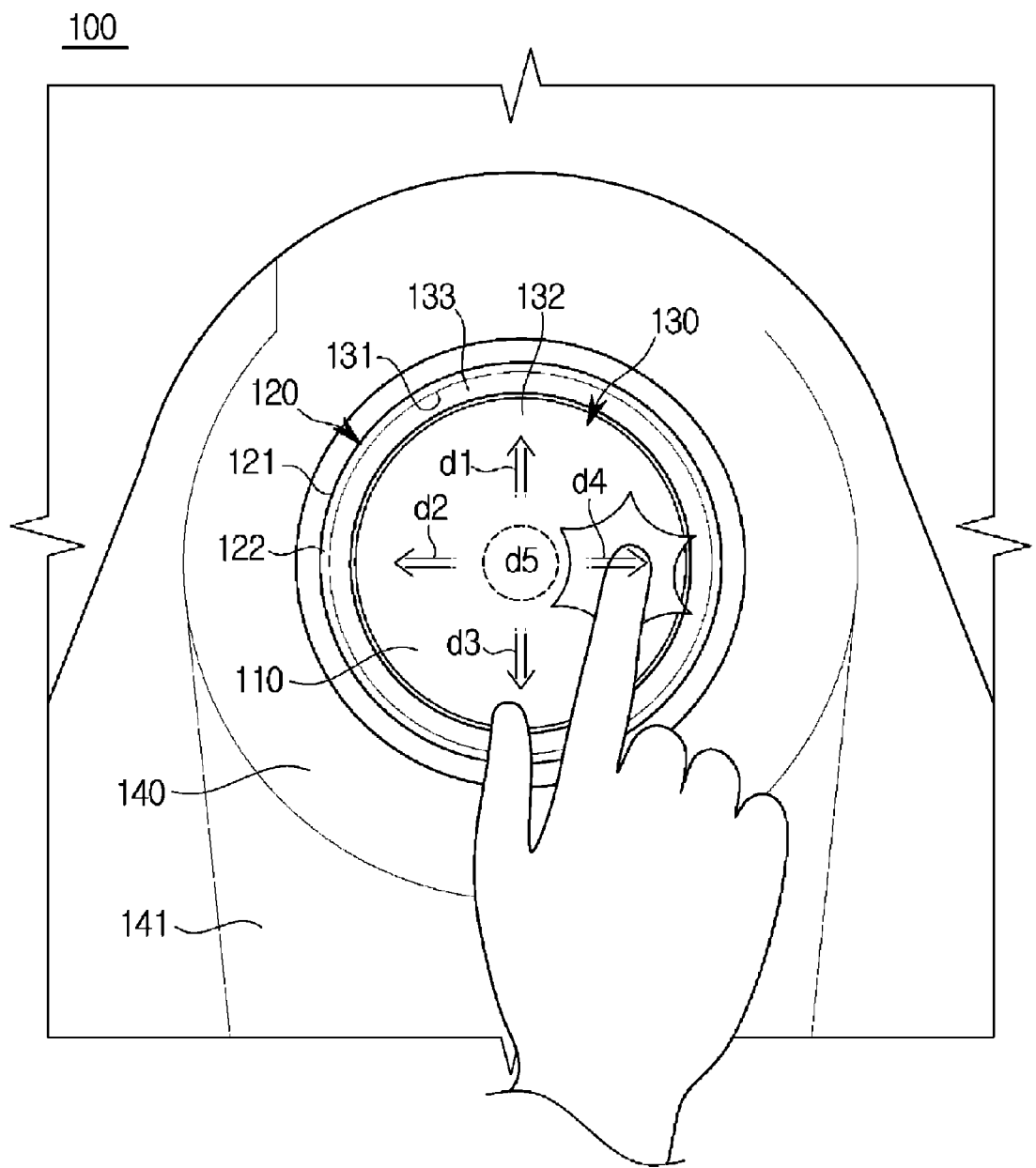
Figure 5:
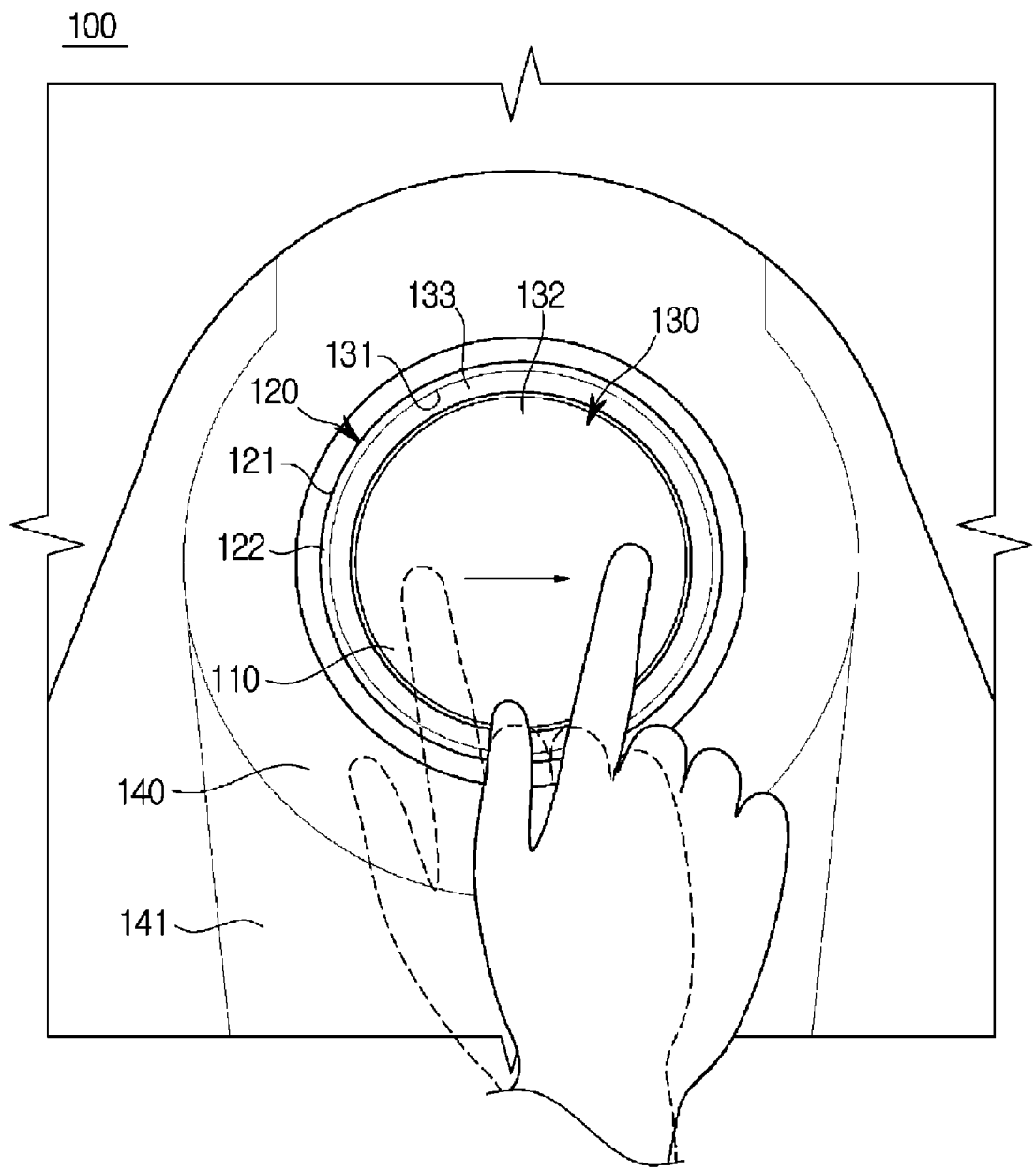
Figure 6:
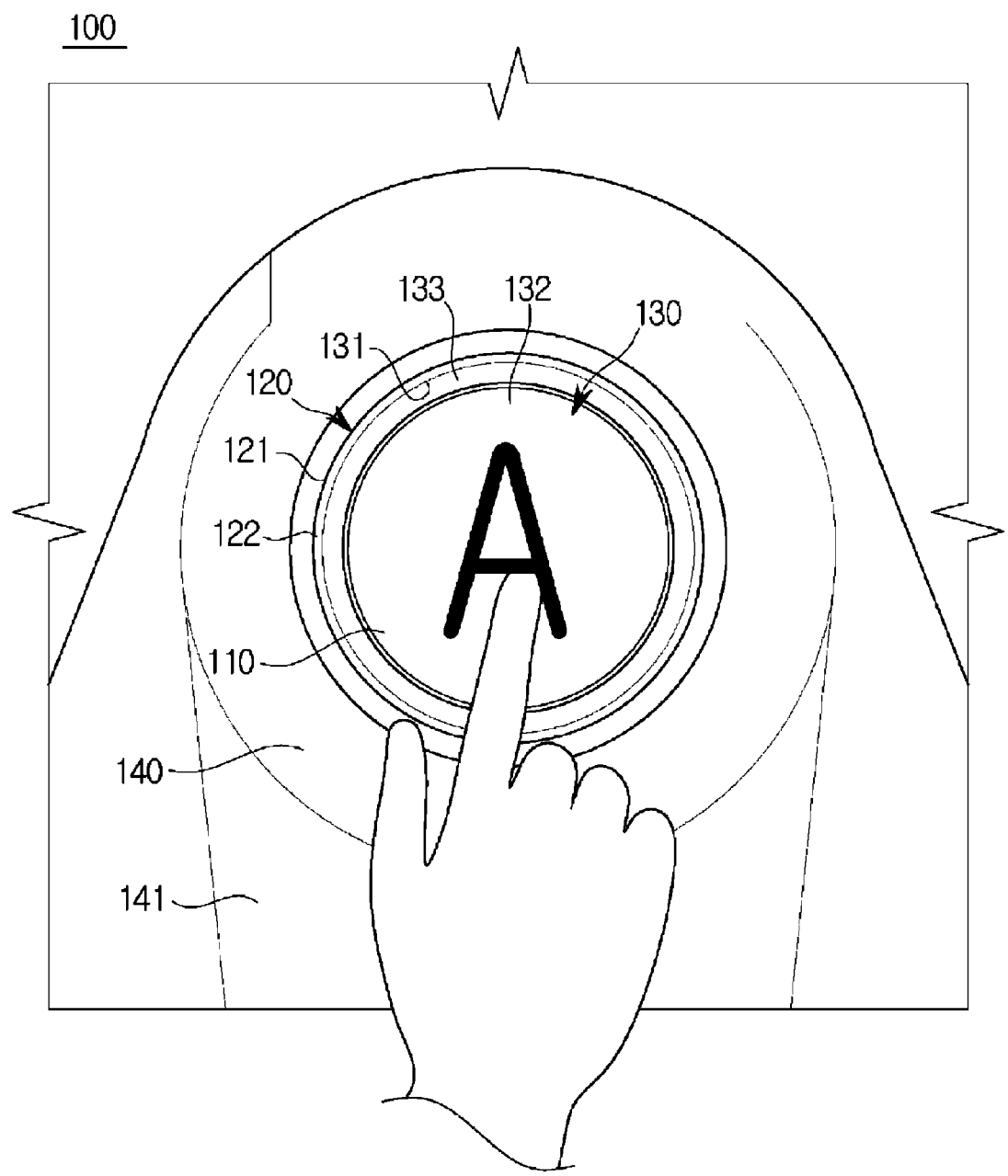

FIGS. 4 to 6 are diagrams illustrating manipulation of a touch input apparatus according to the first embodiment of the present disclosure, in which FIG. 4 shows a pressing input, FIG. 5 shows a swiping input and FIG. 6 shows a character input.

A tap operation of tapping a certain area of the touch part 110 to input a designated execution signal has been described above. In addition, the touch part 110 may be provided to perform a pressing operation or a tilting operation. In addition, the touch part 110 may be provided to be flexible such that only a portion receiving a force is pressed.

The touch part 110 may be tilted with respect to a center axis of the touch part 110 in at least one direction (d1 to d4). For example, referring to FIG. 4, the touch part 110 may be tilted in the front, rear, left, and right directions (d1 to d4). The present disclosure is not limited thereto. According to another embodiment of the present disclosure, the touch part may be tilted in more various directions different from the front, rear, left, and right directions. In addition, when a center portion d5 of the touch part 110 is pressed, the touch part 110 may be pressed while maintaining a horizontal state.

The bottom part 132, on which the touch part 110 is provided, is provided to be movable independent of the inner surface part 131. The bottom part 132 may be provided to perform a pressing operation, and also provided to perform a tilting operation. For example, when a user applies a pressure to the touch part 110, an area of the bottom part 132 having received the pressure may be pressed or the touch part 110 may be tilted to a side of the bottom part having received the pressure.

A user may input a designated execution signal by pressing or tilting a portion of the touch part 110. For example, a user may execute a selected menu by pressing the center portion d5 of the touch part 110. A user may move a cursor to the upper side by pressing an upper portion d1 of the touch part 110.

The structure of the touch part 110 performing a pressing operation may include a button (not shown) installed below the touch part 110. The button is provided to be clicked. That is, a user may input a touch signal by touching the touch part 110, and at the same time, may input a click signal by pressing the touch part 110.

The button may be provided in one unit below the touch part 110. In this case, a user may input a click signal by clicking a center portion of the touch part 110, and may input a touch signal by tapping center/upper/lower/left and right portions of the touch part 110.

Alternatively, the button may be provided in plural. For example, five buttons may be installed at center/upper/lower/left and right portions of the touch part 110, respectively. In this case, a user may input different click signals by clicking the center/upper/lower/left and right portions of the touch part 110, and may input different touch signals by tapping the center/upper/lower/left and right portions of the touch part 110.

Although not shown in the drawing, at an inside of the touch input apparatus 100, various components related to the operation of the touch input apparatus 100 may be included. The touch input apparatus 100 may include a structure enabling the touch part 110 to be pressed or tilted in the above described five directions d1 to d5. The structure may be implemented by generally known technologies, and detailed description and illustration thereof will be omitted.

In addition, at an inside of the touch input apparatus 110, various semiconductor chips and a printed circuit board may be installed. The semiconductor chip is mounted on the printed circuit board, and is configured to perform information processing or store data. The semiconductor chip may interpret a predetermined electric signal generated by an external force, a gesture recognized by the touch part 110 or a manipulation of a button provided on the touch input apparatus 100, generate a predetermined control signal according to the interpretation result, and transmit the generated control signal to a control part or a display part.

Referring to FIG. 5, a user may input a designated execution signal by performing a flicking operation or swiping operation of rubbing an area of the touch part 110. For example, a user may change a current menu displayed on the display part to the next menu by rubbing the touch part 110 rightward while making contact with a left portion of the touch part 110.

Referring to FIG. 6, a user may input a designated execution signal by drawing a number, a character, or a designated gesture on the touch part 110. For example, a user may input "A" in an entry field of the display part by inputting an alphabet character "A" on the touch part 110. As the user directly enters a character on the touch part 110, so that the character is more easily and rapidly input compared to when selecting the character from a character map listed in the display.

A gesture performed at the center portion of the touch part 110 has a high recognition rate, and if similar gestures are input at different positions, the gestures are likely to be recognized as different commands. There is a strong chance of degradation of recognition rate when a user inputs a gesture without looking at a touch region. If a user is able to intuitively recognize a touch region and a boundary through a touch feeling when inputting a gesture while looking forward or looking at a display part or paying attention to outside environments, the user may easily input a gesture at a precise position. Then, the accuracy of inputting a gesture is improved and a user's convenience is improved.

The touch input apparatus 100 according to the first embodiment of the present disclosure is provided with the protrusion part 120 protruding from the mounting surface 140 at an outer portion of the touch part 110, so that a user may be able to recognize the touch region and the boundary of the touch part 110 not in a visual manner but in a tactile manner. A user may easily recognize the protrusion part 120 with a hand fumbling, and since the ridge part 122 of the protrusion part 120 forms a closed curve (for example, a circle), the position of the center portion of the touch part 110 is intuitively recognized. Accordingly, a user may accurately identify the position of the center portion by recognizing side portions of the protrusion part 120 without looking at the touch part 110.

Figure 7:
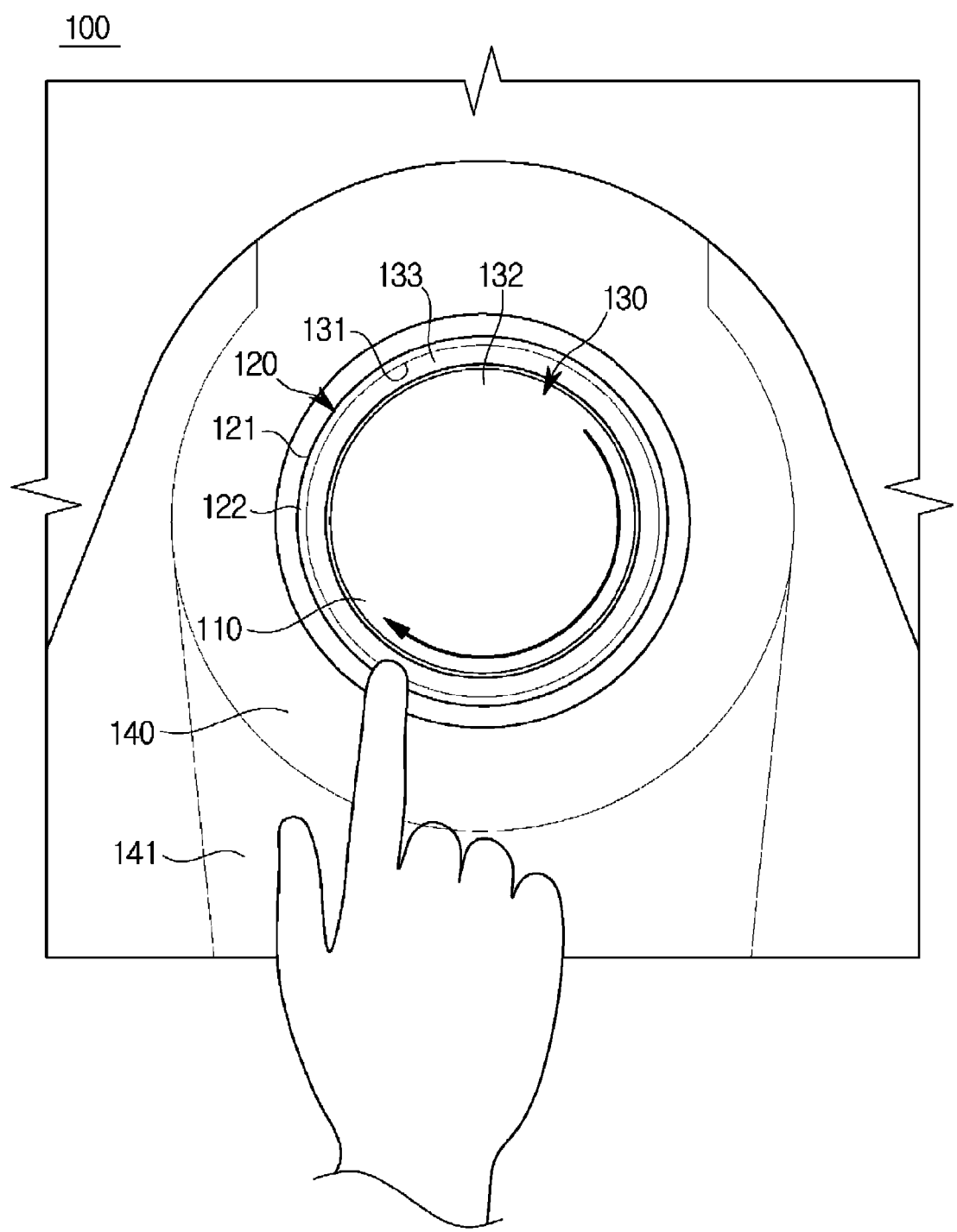
FIG. 7 is a plan view illustrating a touch gesture of a touch input apparatus according to the first embodiment of the present disclosure, which shows a rolling input.

FIG. 7 is a plan view illustrating a touch gesture of a touch input apparatus 100 according to the first embodiment of the present disclosure, which shows a rolling input.

Referring to FIG. 7, a user may input a touch gesture signal by touching the ridge part (122 or the edge part). For example, a user may rub a certain position of the ridge part 122 so that a command corresponding to the position is input, and may rub the ridge part 122 briefly or continuously so that a command corresponding to the rubbing direction or length (angle) is input.

In particular, the ridge part 122 is provided to be touchable, so that a rolling gesture input is easily performed. A user may intuitively recognize the ridge part 122 that is the highest portion in the touch input apparatus 100. When the ridge part 122 is provided in a closed curve (for example, a circle), a rolling gesture of rotating the ridge part 122 one round or more while in contact with the ridge part 122 is easily performed. In addition, since the ridge part 122 is physically and clearly distinguished from the bottom part 132, a user may easily distinguish a touch region provided on each of the ridge part 122 and the bottom part 132. Accordingly, an erroneous command due to interference caused by touch regions adjacent to each other may be prevented.

Although a rolling operation is illustrated, the present disclosure includes a circling operation or spin operation. The rolling represents a touch input scheme of making an arc, and the circling or spin represents a touch input scheme of making a circle.

A user may perform a rolling operation, a circling operation or a spin operation by touching the ridge part 122. As an example of the rolling, when a user inputs a rolling touch by touching the ridge part 122, a different command may be executed according to the rolling direction, the position at which the rolling touch input is performed, or the length by which the rolling touch input is performed.

For example, a case of a pointer rubbing the ridge part 122 in a clockwise direction and a case of a pointer rubbing the ridge part 122 in a counterclockwise direction may provide different touch inputs. In addition, a case of a pointer tapping a left side of the ridge part 122 and a case of a pointer tapping a right side of the ridge part 122 may provide different touch inputs. In addition, when a pointer moves along the ridge part 122 while in touch with one point of the ridge part 122, different touch inputs are provided depending on the positions at which the touch of the pointer ends.

Figure 8:
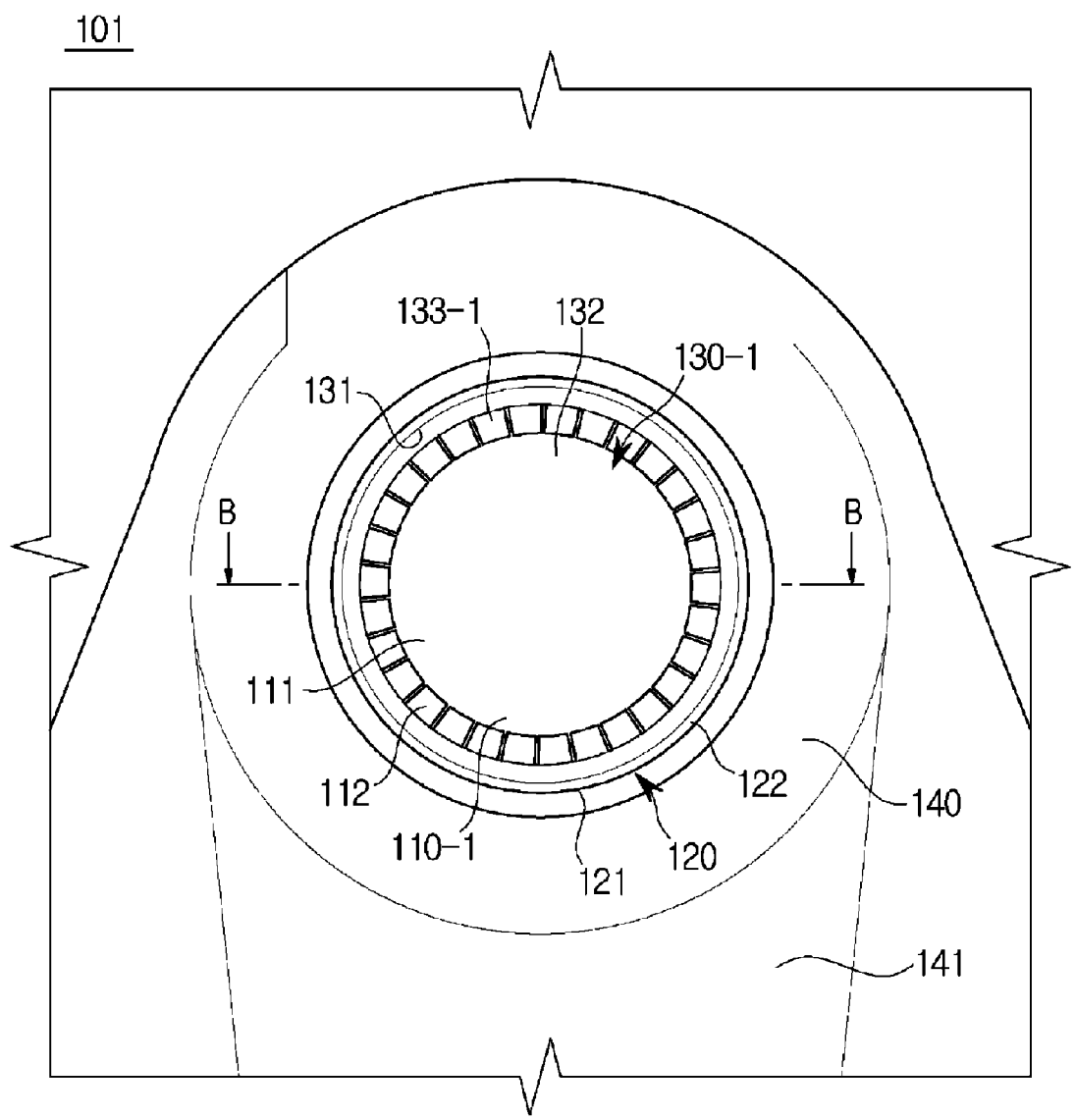
FIG. 8 is a plan view illustrating a touch input apparatus according to the second embodiment of the present disclosure.
Figure 9:
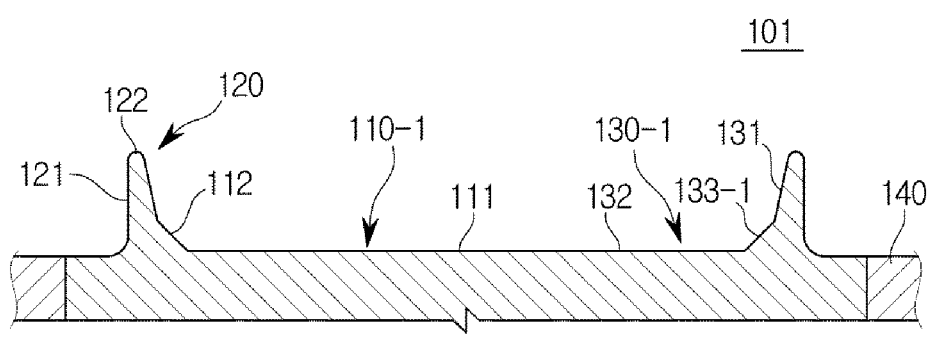
FIG. 9 is a cross-sectional view taken along line B-B of FIG. 8.

FIG. 8 is a plan view illustrating a touch input apparatus 101 according to the second embodiment of the present disclosure, and FIG. 9 is a cross sectional view taken along line B-B of FIG. 8.

The touch input apparatus 101 according to the second embodiment of the present disclosure has a recess part 130-1 including a connection part 133-1 that connects the inner surface part 131 to the bottom part 132. The connection part 133-1 may be provided in a curved surface having an inclination surface or a negative curvature. The negative curvature represents a curvature formed to be concave when the connection part 133-1 is viewed from outside of the recess part 130-1.

The connection part 133-1 is provided to perform a touch input. A user may input a touch signal by contacting the connection part 133-1 or by moving the connection part 133-1 while in contact with the connection part 133-1.

The connection part 133-1 is provided in a curved surface having an inclination surface or a negative curvature, thereby facilitating a touch input of a user. A user may input a designated command by touching or rubbing a region connecting the inner surface part 131 to the bottom part 132.

In addition, a user may intuitively identify the position of the connection part 133-1 without looking at the touch input apparatus 101, for example, while looking forward or looking at the display part. For the connection part 133-1 has an inclination or a curved surface and also the inner surface part 131 is provided at an outer side of the connection part 133-1. Accordingly, a user may input a desired execution command without looking at the connection part 133-1.

A touch part 110-1 according to the second embodiment of the present disclosure may include a center touch part 111 provided on the bottom part 132 and an outer touch part 112 provided on the connection part 133-1. Touch pads provided on the center touch part 111 and the outer touch part 112 may be integrally formed with each other, and may be separately formed from each other.

Meanwhile, the touch pad provided on the outer touch part 112 may extend to the inner surface part 131. A user may input a designated command by touching not only the connection part 133-1 but also the inner surface part 131. Alternatively, the connection part 133-1 and the inner surface part 131 may receive input signals different from each other. That is, a case of touching the connection part 133-1 and a case of touching the inner surface part 131 may input execution commands different from each other.

Figure 10:
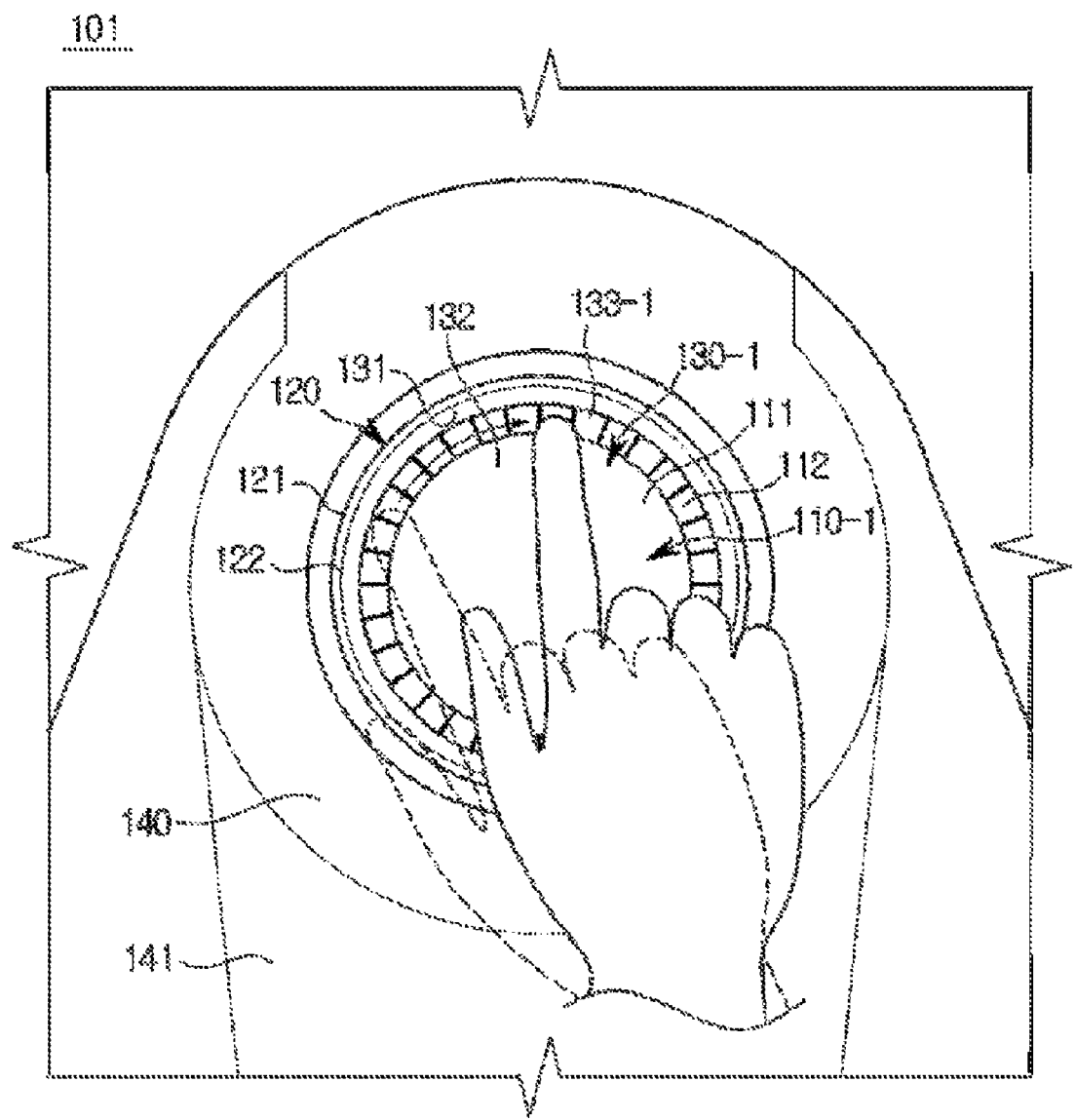
FIG. 10 is a plan view illustrating a touch gesture of a touch input apparatus according to the second embodiment of the present disclosure, which shows a rolling input.

FIG. 10 is a plan view illustrating a touch gesture of a touch input apparatus 101 according to the second embodiment of the present disclosure, which shows a rolling input.

A rolling input represents a touch input scheme of making an arc, and a circling or spin represents a touch input scheme of making a circle. Although a rolling operation is illustrated, the present disclosure includes a circling operation or spin operation.

A user may perform a rolling operation, a circling operation or a spin operation by touching the outer touch part 112. As an example of the rolling operation, when a user inputs a rolling touch by touching the outer touch part 112, different commands may be executed according to the rolling direction, the position at which a rolling touch input is performed, or the length by which a rolling touch input is performed.

For example, a case of a pointer rubbing the outer touch part 112 in a clockwise direction and a case of a pointer rubbing the outer part 112 in a counterclockwise direction may provide different touch inputs. In addition, a case of a pointer tapping a left side of the outer touch part 112 and a case of a pointer tapping a right side of the outer touch part 112 may provide different touch inputs. In addition, when a pointer moves along the outer touch part 112 while in touch with one point of the outer touch part 112, different touch inputs are provided depending on the position at which the touch of the pointer ends.

The connection part 133-1 (or the outer touch part) may include a scale having marks equally distant from each other. The scale may be formed in an embossed manner or engraved manner. When a user rubs the connection part 133-1 by using a finger as a pointer, the user may intuitively identify the number of marks of the scale through a sensation felt by the finger without looking at the scale. For example, when a user inputs a rolling touch of a distance corresponding to five marks of the scale in a clockwise into the connection part 133-1, a cursor displayed on the display may be moved rightward or clockwise by five spaces.

The rolling operation, the circling operation or the spin operation have been described above. However, a user may receive a tap operation of contacting one point of the outer touch part 112 as a touch signal. In this case, a different command may be transmitted depending on the position of the outer touch part 122 that makes contact with the user. For example, when a user makes contact with an upper portion of the touch part 122, a cursor of the display part may be moved upward.

Figure 11:
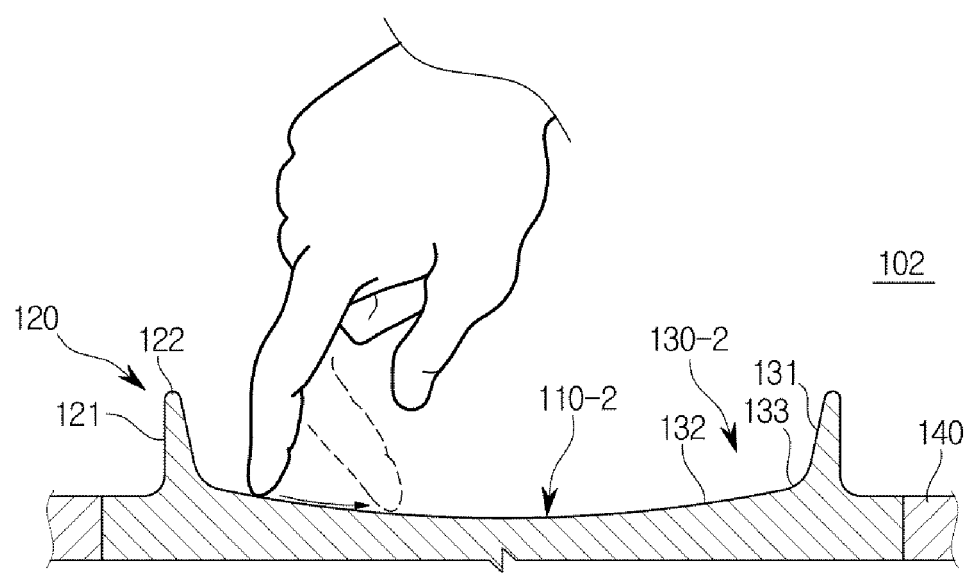
FIG. 11 is a diagram illustrating a trace of a finger when a user inputs a gesture in upper and lower side directions in a touch input apparatus according to the third embodiment of the present disclosure.
Figure 12:
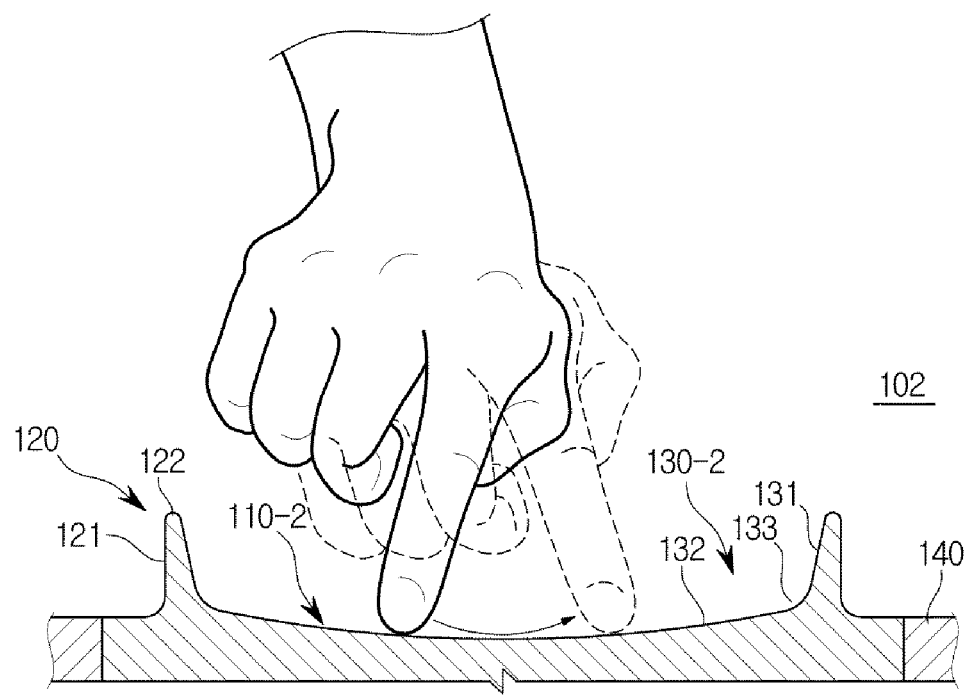
FIG. 12 is a diagram illustrating a trace of a finger when a user inputs a gesture in left and right side directions in a touch input apparatus according to the third embodiment of the present disclosure.

FIG. 11 is a diagram illustrating a trace of a finger when a user inputs a gesture in upper and lower side directions in a touch input apparatus 102 according to the third embodiment of the present disclosure, and FIG. 12 is a diagram illustrating a trace of a finger when a user inputs a gesture in left and right side directions in a touch input apparatus according to the third embodiment of the present disclosure.

The bottom part 132 of a recess part 130-2 of the touch input apparatus 102 according to the third embodiment of the present disclosure has a concave shape. The concave shape represents a concave or depressed shape. The concave shape may include a roundish concave shape, an inclined concave shape or a stepped concave shape.

For example, the bottom part 132 may include a concave curved surface. Referring to FIG. 11, the bottom part 132 may have a concave curved surface with a predetermined curvature. Meanwhile, the bottom part 132 may have curved surfaces different from portion to portion. For example, a center portion of the bottom part 132 may have a curvature (for example, a larger curvature) different from a curvature (for example, a smaller curvature) of an outer portion of the bottom part 132.

A touch part 110-2 may be provided on the bottom part 132. In this case, the touch part 110-2 may include a concave shape provided on the bottom part 132. For example, an area of the touch part 110-2 may be identical to the concave shaped portion provided on the bottom part 132.

As the touch part 110-2 includes a concave curved surface, a touch feeling (or an operation feeling) felt by a user when inputting a gesture may be improved. The curved surface of the touch part 110-2 may be provided to be similar to a trace made by a motion of a tip of a finger when a human moves fingers with a wrist fixed or when a human performs an operation of rotating or twisting a wrist with fingers spread.

When compared to a plane touch part that is generally used, the touch part 110-2 including a concave curved surface as in the third embodiment of the present disclosure may be ergonomically designed. That is, a user's fatigue applied to a wrist is reduced while improving the operation feeling. In addition, when compared to a case of inputting a gesture on the plane touch part 110-2, the input accuracy is improved.

Referring to FIG. 11, when moving fingers up and down directions, a user may input a gesture by only a natural motion of the fingers without moving or folding joints except for the fingers. Similarly, referring to FIG. 12, when moving fingers in the left and right side directions, a user may input a gesture by only a natural motion of the fingers and a wrist without excessively twisting the wrist. As the touch part 110-2 according to the embodiment of the present disclosure is ergonomically designed so that a user may have a less fatigue even with a long period of use of the touch input apparatus, and a musculoskeletal system disorder caused on a wrist or other joints may be prevented.

In addition, the touch part 110-2 may be provided in a circular shape. The touch part 110-2 provided in a circular shape may facilitate forming of a concave curved surface. In addition, when the touch part 110-2 is provided in a circular shape, a user may sense a touch region of the circular touch part 110-2 by a tactile sensation, thereby easily inputting a rolling operation or a circling operation.

In addition, as the touch part 110-2 is provided in a curved surface, a user may identify the position at which a finger is placed on the touch part 110-2. Since the touch part 110-2, provided in a curved surface, has different inclinations from portion to portion of the touch part 110-2, a user may intuitively identify the position at which a finger is placed on the touch part 110-2 by a sensation of an inclination felt through the finger.

Such a feature provides a feedback indicating a position at which a finger is placed on the touch part 110-2 when a user inputs a gesture to the touch part 110-2 without looking at the touch part 110-2, so that the user may easily input a desired gesture and the input accuracy of the gesture may be improved.

Meanwhile, a touch pad used in the touch part 110-2 provided in a curved surface may touch a touch by using an optical scheme. For example, infrared LED (IR LED) and a photodiode array may be disposed on a rear surface of the curved shape touch part 110-2. The IR LED and the photodiode obtains an infrared image reflected by a finger, and the control part extracts a touch point from the obtained image.

Meanwhile, a diameter and a depth of the touch part 110-2 may be ergonomically designed. For example, the touch part 110-2 may have a diameter of about 50 mm to 80 mm.

When considering an average length of a finger of an adult, a range of motion formed by a single natural finger motion with a wrist fixed may be selected within 80 mm. If the diameter of the touch part 110-2 exceeds 80 mm, a user makes an unnatural hand motion when drawing a circle on a swiping input part 220, and the wrist needs to be excessively moved.

On the contrary, if the diameter of the touch part 110-2 is smaller than 50 mm, an area of the touch region is reduced so that various possibilities to input gestures are limited. In addition, since a gesture is made in a narrow region, an error rate of gesture inputs may be increased.

In addition, when the touch part 110-2 is provided in a spherical surface shape, a value of a depth divided by a diameter of the touch part 110-2 may be selected from a range of 0.04 to 0.1. A value of the depth of the touch part 110-2 divided by the diameter of the touch part 110-2 may represent a degree of roundness of the curved surface of the touch part 110-2. That is, when the diameter is assumed to be the same, the touch part 110-2 has a further concaved shape as a value of a depth divided by a diameter is larger, and the touch part 110-2 has a further flat shape as a value of a depth divided by a diameter is smaller.

If a value of a depth of the touch part 110-2 divided by a diameter of the touch part 110-2 is larger than 0.1, a curvature of the concave is increased, and thus a user has an uncomfortable touch feeling. The concave shape of the touch part 110-2 needs to be matched with a curvature of a curve made by a tip of a finger in a natural finger movement of a user. However, if a value of the depth of the touch part 110-2 divided by the diameter of the touch part 110-2 exceeds 0.1, a user requires an excessively great force when moving a finger along the curved surface of the touch part 110-2, thereby having a unnatural operation feeling. In addition, when a user naturally moves a finger without realizing it, the tip of a finger may be separated from the curved surface. In this case, the touch of gesture is disconnected, so that recognition error occurs.

In addition, if the depth of the touch part 110-2 is significantly small, a user does not have a benefit to use the curved portion. If a value of the depth of the touch part 110-2 divided by the diameter of the touch part 110-2 is smaller than 0.04, a user has difficulty in feeling difference in the operation feeling compared to when making a gesture on the flat touch part 110-2.

Figure 13:
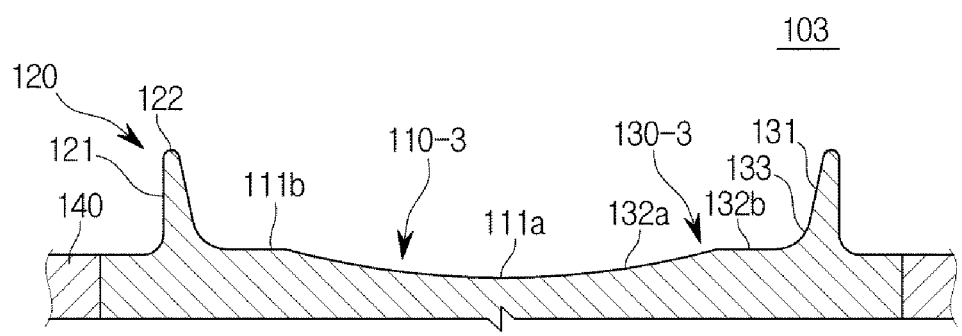
FIG. 13 is a cross-sectional view illustrating a touch input apparatus according to the fourth embodiment of the present disclosure.

FIG. 13 is a cross-sectional view illustrating a touch input apparatus 103 according to the fourth embodiment of the present disclosure.

A touch part 110-3 of the touch input apparatus 103 according to the fourth embodiment of the present disclosure includes a center touch part 111a provided in a concave curved surface and an outer touch part 111b provided in a flat surface while surrounding the center touch part 111a.

Meanwhile, the bottom part 132 includes a first bottom part 132a provided in a concave curved surface at the center of the bottom part 132 and a second bottom part 132b provided in a flat surface while surrounding the first bottom part 132a.

The center touch part 111a is provided on the first bottom part 132a, and the outer touch part 111b is provided on the second bottom part 132b.

The center touch part 111a and the outer touch part 111b may receive touch signals independent from each other. For example, the center touch part 111a may receive a gesture touch signal, and the outer touch part 111b may receive a direction touch signal.

A touch pad of the center touch part 111a and a touch pad of the outer touch part 111b may be integrally formed with each other, or may be separately formed from each other. When the touch pads are integrally formed with each other, the touch pads may receive touch signals independent of each other by software.

Alternatively, the center touch part 111a and the outer touch part 111b may execute a new command by combining a touch signal input to each of the center touch part 111a and the outer touch part 111b. For example, when a user inputs a flicking gesture or a swiping gesture to the center touch part 111a, an icon of a sub menu may be shifted. When a user inputs a flicking gesture or a swiping gesture to the center touch part 111a while in contact with the outer touch part 111b, an icon of a main menu may be shifted. According to such a touch input, an operation of moving from a sub menu to a main menu and then changing an icon of the main menu is simplified, so that an icon of the main menu may be changed in a sub menu. That is, an operation may be moved from a music replay menu to a navigation menu.

Figure 14:
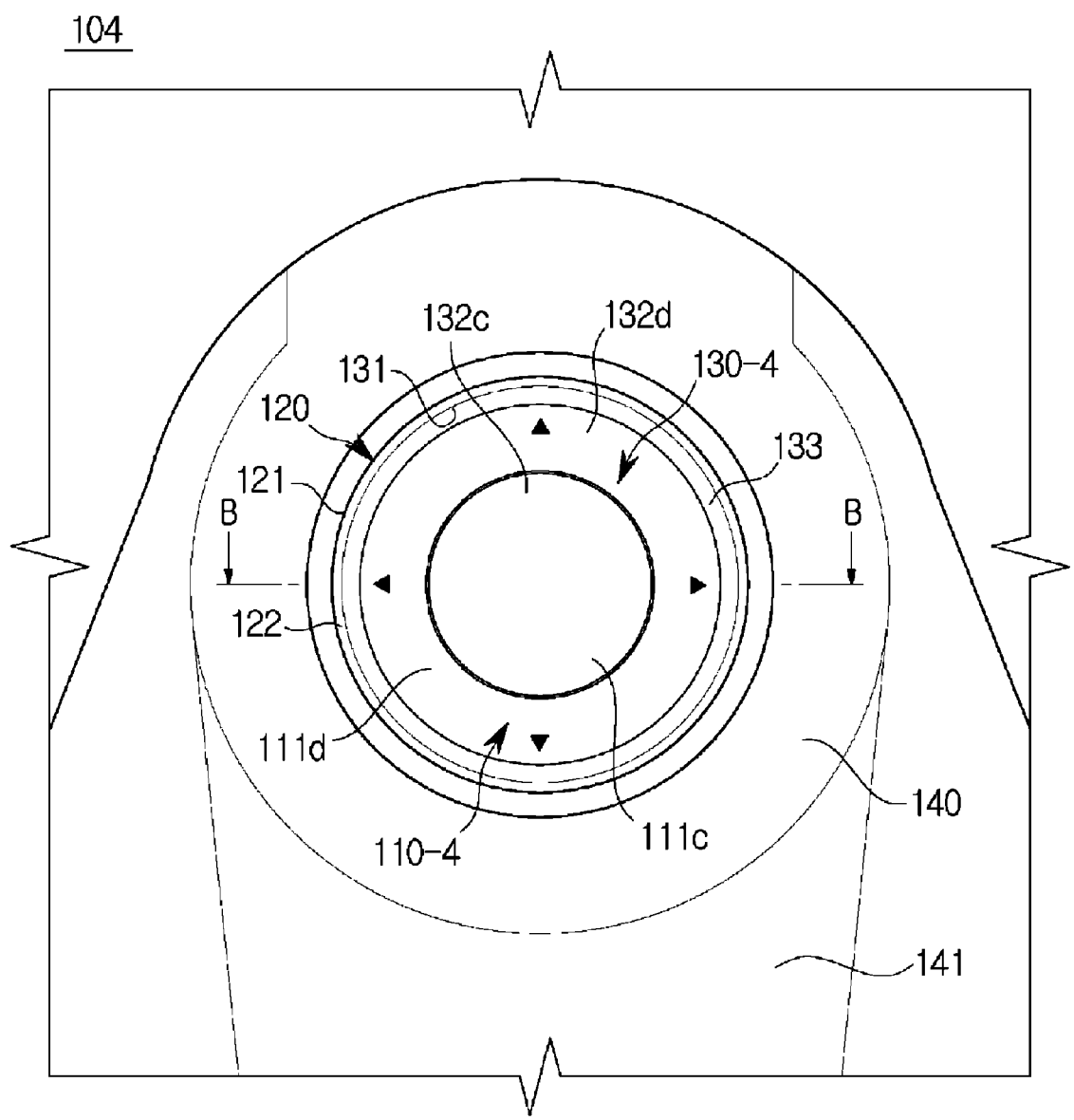
FIG. 14 is a cross-sectional view illustrating a touch input apparatus according to the fifth embodiment of the present disclosure.
Figure 15:
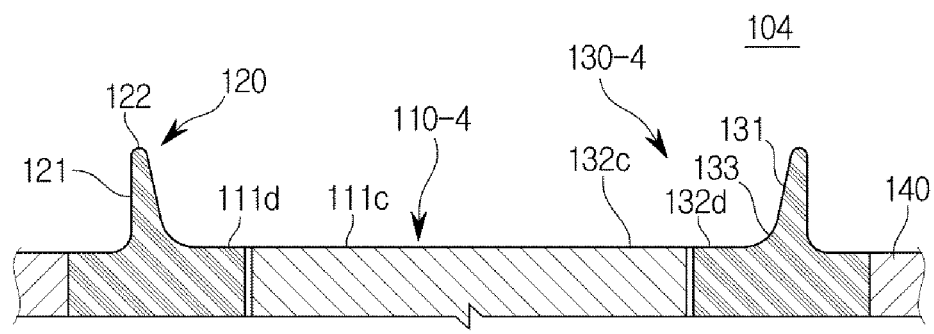
FIG. 15 is a cross-sectional view taken along line B-B of FIG. 14.

FIG. 14 is a cross-sectional view illustrating a touch input apparatus 104 according to the fifth embodiment of the present disclosure, and FIG. 15 is a cross-sectional view taken along line B-B of FIG. 14.

A touch part 110-4 of the touch input apparatus 104 according to the fifth embodiment of the present disclosure includes a center touch part 111c and an outer touch part 111d surrounding the center touch part 111c.

Meanwhile, the bottom part 132 may include a first bottom part 132c positioned at the center of the bottom part 132 and a second bottom part 132d surrounding the first bottom part 132c. The first bottom part 132c and the second bottom part 132d may be separately provided from each other. Accordingly, the first bottom part 132c may be moved independent of the second bottom part 132d. Alternatively, the second bottom part 132d may be moved in dependent of the first bottom part 132c.

The center touch part 111c may be provided on the first bottom part 132c, and the outer touch part 111d may be provided on the second bottom part 132d.

The center touch part 111c and the outer touch part 111d may be provided to be physically separated from each other. Accordingly, a touch pad of the center touch part 111c and a touch pad of the outer touch part 111d may be provided to be independent of each other.

The center touch part 111c and the outer touch part 111d may be provided to be movable independent of each other. For example, the center touch part 111c may have a structure capable of being pressed, and the outer touch part 111d may have a structure capable of being tilted in four directions. In this case, a user may tilt the outer touch part 111d by applying a pressure to the outer touch part 111d, to move a cursor on the display part. In addition, a user may click the center touch part 111d by applying a pressure to the center touch part 111c, to select a menu at which a cursor of the display part is positioned.

In addition, the center touch part 111c and the outer touch part 111d may have different movement structures, respectively. For example, the center touch part 111c may have a structure being able to be tilted, and the outer touch part 111d may have a structure being capable of being pressed.

In addition, the center touch part 111c and the outer touch part 111d may not include movement structures. In this case, the center touch part 111d and the outer touch part 111d are physically separated from each other and provided with different touch pads, respectively. The center touch part 111c, the outer touch part 111d and the outer touch part 112 may be provided to receive touch signals independent of each other. For example, the center touch part 111c may receive a gesture touch signal, the outer touch part 111d may receive a direction touch signal and the outer touch part 112 may receive a rolling touch signal or a circle touch signal.

Figure 16:
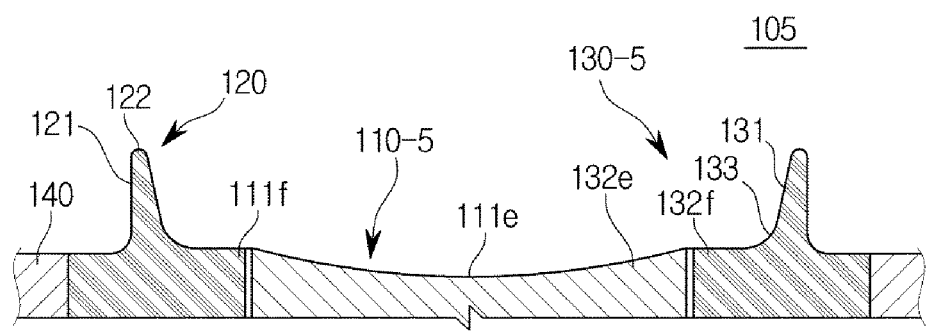
FIG. 16 is a cross-sectional view illustrating a touch input apparatus according to the sixth embodiment of the present disclosure.

FIG. 16 is a cross-sectional view illustrating a touch input apparatus 105 according to the sixth embodiment of the present disclosure.

A touch part 110-5 of the touch input apparatus 105 according to the sixth embodiment of the present disclosure may include a center touch part 111e provided in a concave curved surface and an outer touch part 111f provided in a flat surface while surrounding the center touch part 111e.

Meanwhile, the bottom part 132 may include a first bottom part 132e provided as a concave curved surface at the center of the bottom part 132 and a second bottom part 132f provided as a flat surface while surrounding the first bottom part 132e.

The center touch part 111e may be provided on the first bottom part 132e and the outer touch part 111f may be provided on the second bottom part 132f.

The center touch part 111e and the outer touch part 111f may be provided to be physically separated from each other. Accordingly, a touch pad of the center touch part 111e and a touch pad of the outer touch part 111f may be provided to be independent of each other.

Figure 17:
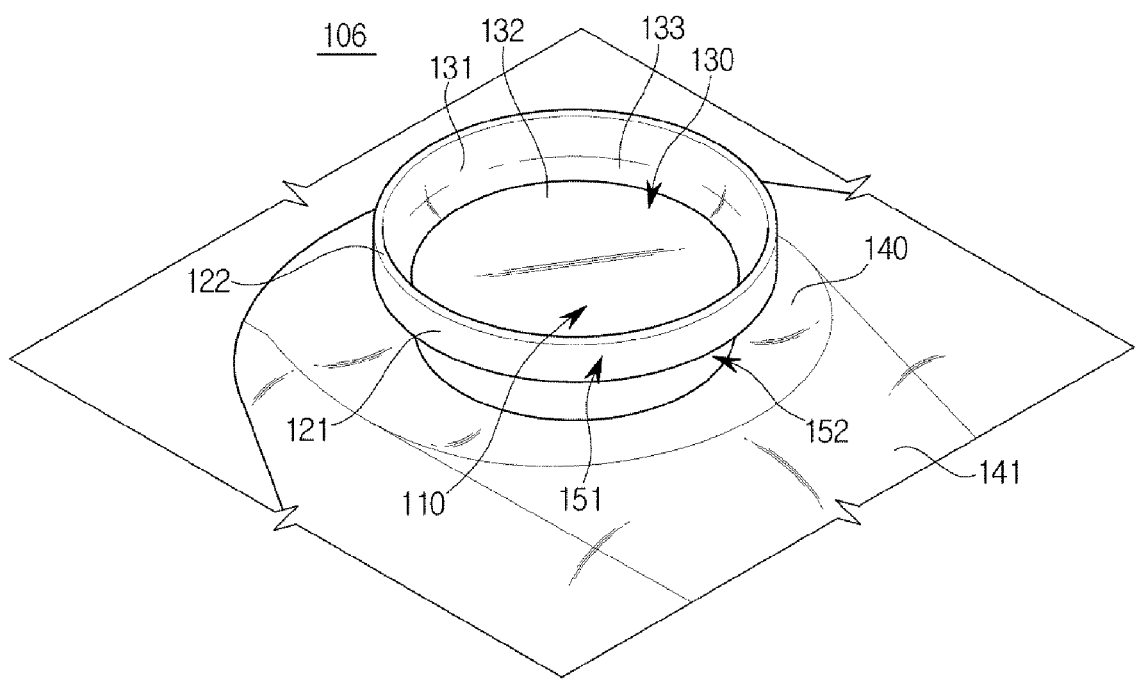
FIG. 17 is a perspective view illustrating a touch input apparatus according to the seventh embodiment of the present disclosure.
Figure 18:
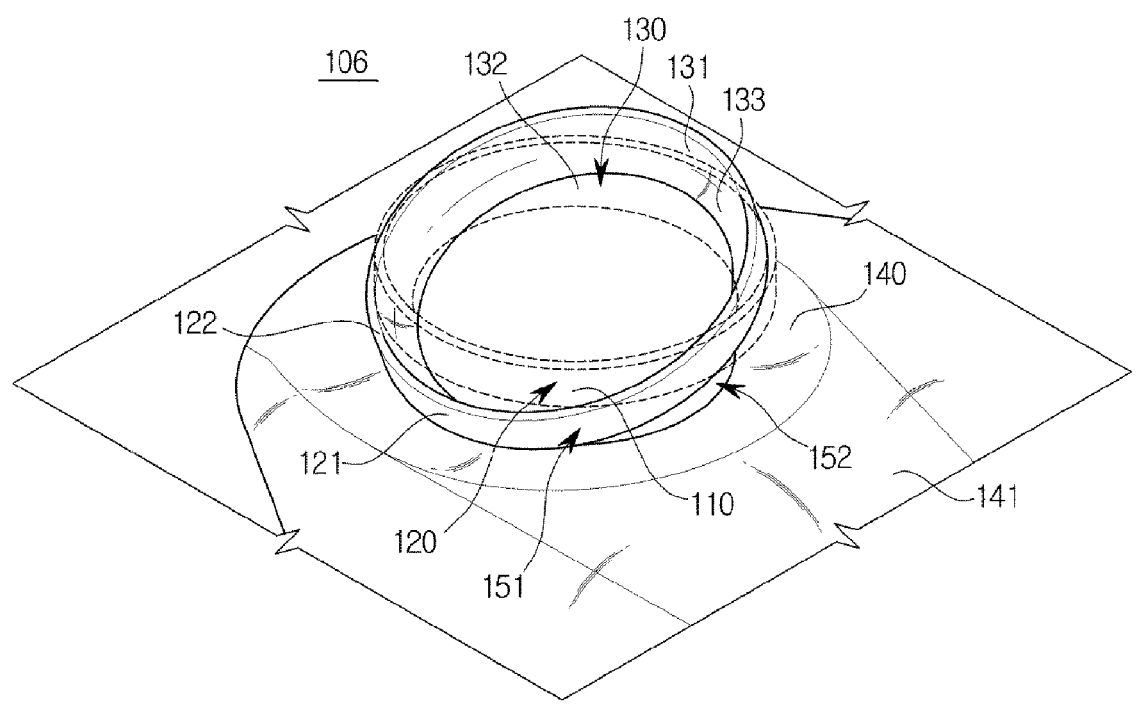
FIG. 18 is a perspective view illustrating a manipulation of a touch input apparatus according to the seventh embodiment of the present disclosure.

FIG. 17 is a perspective view illustrating a touch input apparatus 106 according to the seventh embodiment of the present disclosure, and FIG. 18 is a perspective view illustrating a manipulation of a touch input apparatus 106 according to the seventh embodiment of the present disclosure.

The touch input apparatus 106 according to the seventh embodiment of the present disclosure may be provided to be inclined or tilted. The touch input apparatus 106 forms a single structure including the protrusion part 120 and the recess part 130, and is provided to be tilted with respect to the mounting surface 140. In addition, the touch input apparatus 106 is provided to perform a pressing operation.

The touch input apparatus 106 may include a body part 151 including the protrusion part 120 and the recess part 130 and a support part 152 to support the body part 151. The support part 152 is installed to be tilted with respect to the mounting surface 140 while supporting the body part 151. Structures allowing a tilting operation may be implemented using generally known technologies, and details and illustration thereof will be omitted.

The touch input apparatus 106 may be tilted in at least one direction with respect to a center axis of the touch input apparatus 106. For example, the touch input apparatus 106 may be tilted in front/rear/left/right side directions with respect to the center axis. According to another embodiment, the touch input apparatus 106 may be tilted in more various directions. In addition, when a center portion of the touch input apparatus 106 is pressed, the touch part 110 may be pressed while maintaining a horizontal state.

A user may input a designated execution signal by pressing or tilting the touch input apparatus 106. For example, a user may execute a selected menu by pressing the center portion of the touch input apparatus 106. A user may move a cursor to a upper side by pressing an upper portion of the touch input apparatus 106.

Although not shown in the drawing, at an inside of the touch input apparatus 106, various components related to the operation of the touch input apparatus 106 may be included. The touch input apparatus 106 may include a structure enabling the touch part to be pressed or tilted in the above described five directions. The structure may be implemented by generally known technologies, and detailed description and illustration thereof will be omitted.

Figure 19:
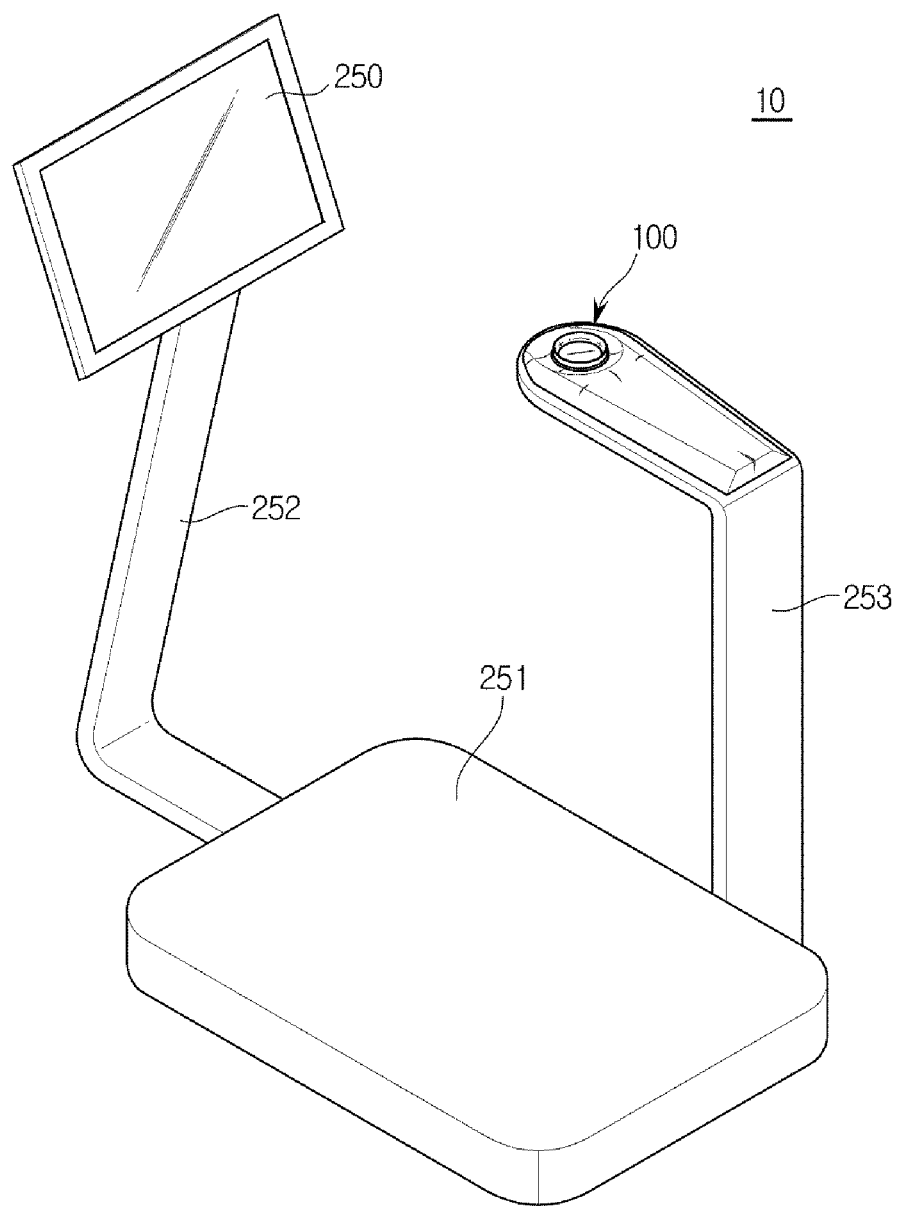
FIG. 19 is a perspective view illustrating a touch input apparatus according to the first embodiment of the present disclosure, installed on a health device.

FIG. 19 is a perspective view illustrating a touch input apparatus 100 according to the first embodiment of the present disclosure installed on a health device.

The touch input apparatus 100 according to the embodiment of the present disclosure may be installed on a health device 10. The health device may include a medical device. The heath device 10 may include a body part 251 onto which a user may be stepped, a display part 250, a first connection part 133, 252, the touch input apparatus 100, and a second connection part 133, 253 connecting the touch input apparatus 100 to the body part 251.

Figure 20:
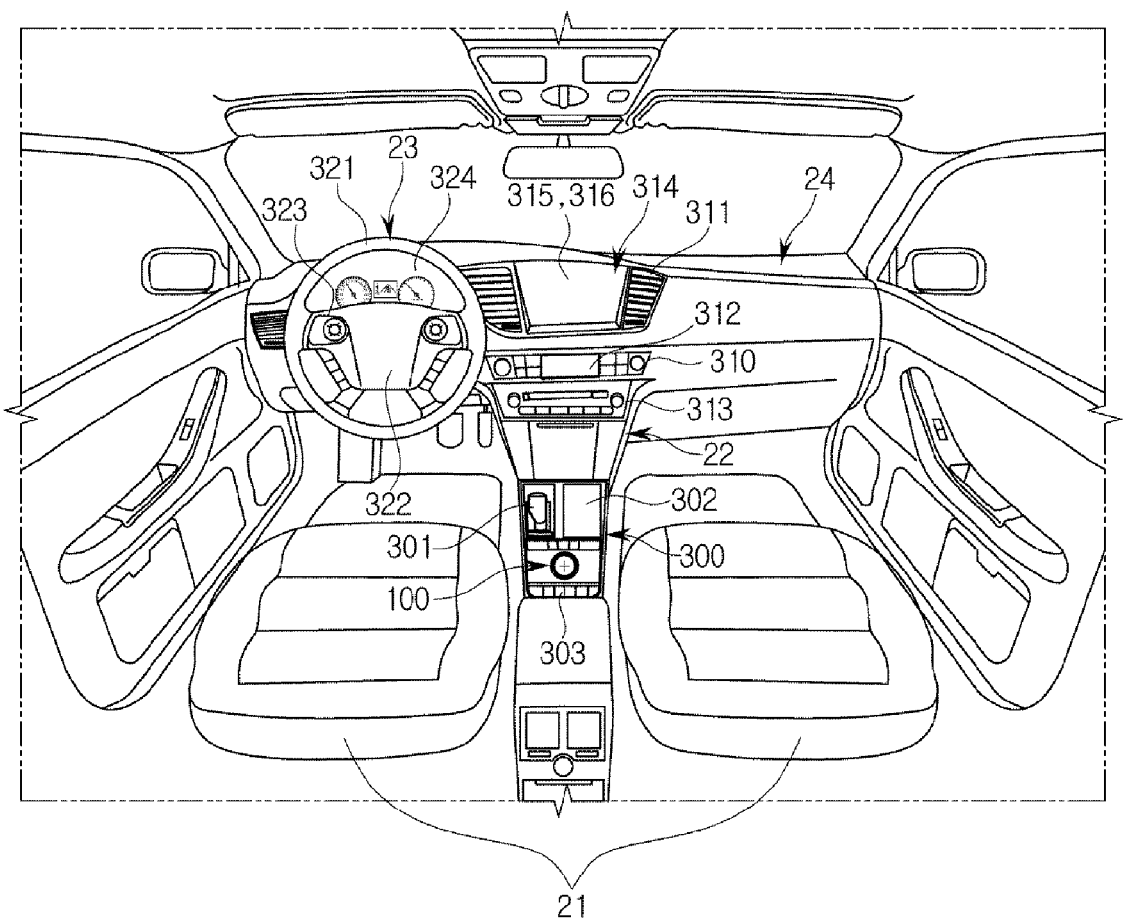
FIG. 20 is a diagram illustrating the interior of a vehicle in which a touch input apparatus according to the first embodiment of the present disclosure is installed.

The body part 251 may measure various pieces of physiological information, including the weight of a user. In addition, the display part 250 may display various pieces of image information, including the measured physiological information. In addition, a user may manipulate the touch input apparatus while looking at the display part 250. FIG. 20 is a diagram illustrating a touch input apparatus 100 according to the first embodiment of the present disclosure installed in a vehicle 20, which shows the interior of the vehicle.

The touch input apparatus 100 according to the first embodiment of the present disclosure may be installed in the vehicle 20.

The vehicle 20 represents various apparatuses designed to transport an object, for example, a human, a substance or an animal, from an origin to a destination. The vehicle 20 may include an automobile travelling on a road or a track, a vessel moving on the sea or river, and an air craft flying by using support from the air.

In addition, the vehicle travelling on a road or a track may be moved in a predetermined direction according to rotation of at least one wheel of the vehicle, and the vehicle includes a tricar, a four-wheel drive car, a construction machine, a two wheeled car, a prime mover apparatus, a bicycle and a train travelling on a track.

Referring to FIG. 20, the vehicle 20 may include a seat 21 on which a passenger is seated and a dashboard 24 at which a gear box 300, a center fascia 22 and a steering wheel 23 are provided.

At the center fascia 22, an air conditioning apparatus 30, a clock 312, an audio apparatus 313 and an audio-video-navigation (AVN) apparatus may be installed.

The air conditioning apparatus 310 adjusts the temperature, the humidify, and the cleanliness of air inside of the vehicle 20 and the flow of air inside of the vehicle 20 to maintain a pleasant atmosphere in the vehicle. The air conditioning apparatus 310 may include at least one vent 311 to discharge air conditioned wind. The center fascia 22 may be provided with a button or a dial to control the air conditioning apparatus 310, and so on. A user, such as a driver, may control the air conditioning apparatus 310 by using the button disposed on the center fascia 22.

The clock 312 may be provided around the button or the dial to control the air conditioning apparatus 310.

The audio apparatus 313 includes an operation panel provided with a plurality of buttons that perform various functions. The audio apparatus 313 provides a radio mode providing a radio function and a media mode playing an audio file stored in various types of storage media.

The AVN apparatus 314 may be buried in the center fascia 22 of the vehicle 20, or may be protruded from the dashboard 24. The AVN apparatus 314 is an apparatus performing an integrated function of an audio function, a video function and a navigation function according to a manipulation of a user. The AVN apparatus 314 includes an input part 314 to receive a user's command with respect to the AVN apparatus 314 and a display 316 to display a screen related to an audio function, a screen related to a video function or a screen related to a navigation function. Meanwhile, a function of the audio apparatus 313 overlapping the function of the AVN apparatus 314 may be omitted.

The steering wheel 23 is an apparatus configured to control a running direction of the vehicle, and includes a rim 321 graphed by a driver and a spoke 322 connected to a steering apparatus of the vehicle 20 and connecting the rim 321 to a hub of a rotating shaft for steering. According to an embodiment of the present invention, the spoke 322 may be provided with a manipulation apparatus 323 to control various apparatuses in the vehicle 20, for example, an audio apparatus.

In addition, the dashboard 24 may further include an instrument panel 324 to notify the user regarding vehicle speed, travel distance, engine RPM, fuel gauge, temperature of cooling water, and various warning, and a glove box 325 to accommodate various articles.

The gear box 300 may be installed between a driver seat and an assistant seat in the vehicle 20, and may be provided with manipulation apparatuses that need to be manipulated during driving of the vehicle 20.

Figure 21:
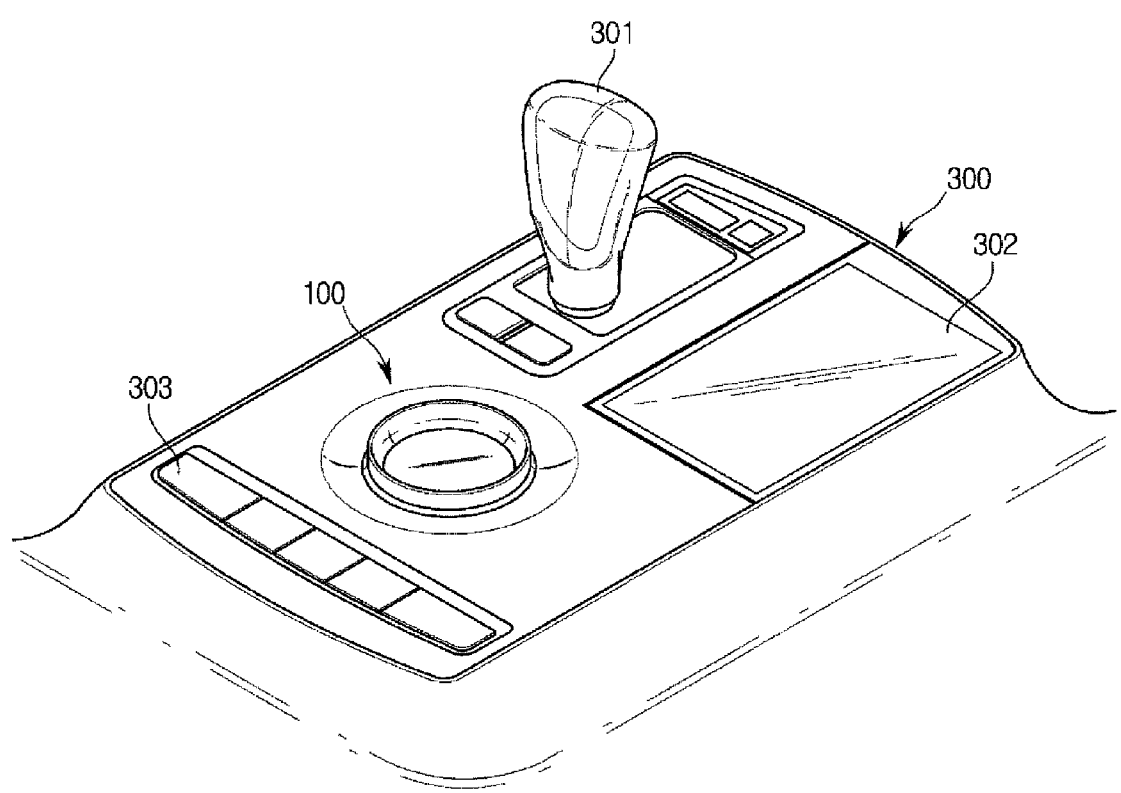
FIG. 21 is a perspective view illustrating a gear box at which a touch input apparatus according to the first embodiment of the present disclosure is installed.

FIG. 21 is a perspective view illustrating a touch input apparatus 100 according to the first embodiment of the present disclosure installed at a gear box.

Referring to FIG. 21, the gear box 300 may include a gear level 301 for transmission of the vehicle 20, a display part 302 to control functions of the vehicle 20, and a button 303 to execute various apparatuses of the vehicle 20. In addition, the touch input apparatus 100 according to the first embodiment of the present disclosure is installed at the gear box 300.

The touch input apparatus 100 according to the first embodiment of the present disclosure is installed at the gear box 300, positioned so as to be manipulated while a driver is looking forward. For example, the touch input apparatus 100 may be positioned at a lower side of the transmission level 301. Meanwhile, the touch input apparatus 100 may be installed at the center fascia 22, at a passenger seat or a back seat.

The touch input apparatus 100 may select or execute various icons being displayed on display apparatuses in connection with the display apparatuses in the vehicle 20. The display apparatuses installed in the vehicle 20 may be provided on the audio apparatus 313, the AVN apparatus 314 or the instrument panel 324. If necessary, the display part 302 may be installed on the gear box 300. In addition, the display apparatus may be connected to a Head Up Display (HUD) apparatus or a back mirror.

For example, the touch input apparatus 100 may move a cursor or execute an icon, the cursor and the icon being displayed on the display apparatuses. The icon may include a main menu, a selection menu, and a setting menu. In addition, the touch input apparatus 100 may allow a navigation system to be operated, allow a driving condition of the vehicle to be set, or allow peripheral devices of the vehicle to be executed.

As is apparent from the above, a signal is input by a touch of an edge part provided at a top of a rising surface that rises from a mounting surface, so that a dial can be omitted. In addition, the edge part provides various intuitive operating methods and enables recognition of various touch gestures, thereby performing various and improved functions compared to when using a dial.

In addition, since a protrusion part surrounding a touch part is formed to be higher than a mounting surface around the protrusion part, a user may intuitively identify a touch region while viewing forward, so that a rapid and safe touch input can be achieved and a recognition rate of a gesture touch signal can be improved.

In particular, when the touch input apparatus is applied to a vehicle, a driver can input a precise gesture while maintaining a user's forward gaze when manipulating a navigation system or an audio apparatus during driving.

In addition, the touch part includes a form of a concave curved surface, so that a user intuitively identifies an area of a touch input part where a finger is positioned by feeling inclination through the finger even if the user does not views the touch input part, so that a touch gesture corresponding to a user's intention can be input.

In addition, the touch part includes a form of a concave curved surface, so that an operation feeling and a touch feeling can be improved when a user inputs a touch gesture. In addition, the shape of the touch part is ergonomically designed, so that the user does not have burden on a wrist or joints of a hand even with a long time use of the touch input apparatus.

In addition, a swiping input part is provided around a gesture input part to serve as a dial being able to be physically rotated. In addition, the swiping input part may recognize various touch gestures, thereby performing more various and improved functions than those of a dial.

In addition, the swiping input part is provided with a tactile scale, so that an angle (or a distance) swiped by a user can be intuitively identified. Accordingly, a different signal is input depending on the swiping angle (or the swiping distance), thereby improving the degree of freedom of manipulation and the input accuracy.

In addition, the gesture input part and the swiping input part are provided to have different inclinations from each other, so that a user can intuitively distinguish the gesture input part from the swiping input part.

In addition, the touch input part is provided so as to be pressed in a plurality of directions, and the touch input part performs different functions depending on the pressed directions, thereby enabling rapid execution of a command.

Although various embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A touch input apparatus installed on a mounting surface, the touch input apparatus comprising:
    an outer surface that rises from the mounting surface;
    an edge part provided at a top of the outer surface;
    an inner surface that declines from the edge part; and
    a bottom surface that extends from the inner surface and further includes a touch part configured to receive a touch signal of a user,
    wherein the edge part is provided to receive a touch signal of a user,
    wherein the touch part is provided at a center thereof with a center touch part and provided with an outer touch part surrounding the center touch part,
    wherein the bottom surface includes a first bottom part on which the center touch part is provided and a second bottom part on which the outer touch part is provided, and
    the first bottom part and the second bottom part are movable relative to each other.

2. The touch input apparatus of claim 1, wherein the edge part forms a closed curve.

3. The touch input apparatus of claim 1, wherein the edge part is provided to receive a different signal depending on a position of the edge part which makes contact with a pointer.

4. The touch input apparatus of claim 1, wherein the edge part is provided to receive a different signal depending on a trace connecting a start point at which a pointer makes contacts with the edge part to an end point at which the pointer is separated from the edge part.

5. The touch input apparatus of claim 1, wherein the outer surface is integrally formed with the mounting surface.

6. The touch input apparatus of claim 1, wherein the edge part and the bottom surface are each provided in a circular shape.

7. The touch input apparatus of claim 1, wherein the inner surface includes an upper inner surface declining from the edge part and a lower inner surface connecting the inner surface to the bottom surface and provided as a curved surface having an inclination surface or a negative curvature.

8. The touch input apparatus of claim 1, wherein the touch part has a form of a concave curved surface.

9. The touch input apparatus of claim 1, wherein the bottom surface is movable independent of the inner surface.

10. The touch input apparatus of claim 9, wherein the bottom surface is provided so as to be capable of being tilted in upward, downward, leftward, and rightward directions.

11. The touch input apparatus of claim 1, wherein
    the center touch part and the outer touch part independently receive a touch signal.

12. The touch input apparatus of claim 11, wherein the center touch part includes a form of a concave curved surface.

13. The touch input apparatus of claim 1, wherein the first bottom part is provided so as to be capable of being tilted.

14. The touch input apparatus of claim 1, wherein the outer surface, the edge part and the inner surface form a single structure, and the structure is provided so as to be capable of being tilted with respect to the mounting surface.

15. A touch input apparatus installed on a mounting surface, the touch input apparatus comprising:
- a protrusion part installed so as to protrude from the mounting surface in a form of a pillar;
- a recess part formed in a recess manner while including a center portion of the protrusion part, the recess part including an inner surface part connecting from an edge part of the protrusion part to a lower side and a bottom surface connected to the inner surface part; and
- a touch part provided on the bottom surface of the recess part and configured to receive a touch signal of a user,
- wherein the edge part is provided to receive a touch signal of a user,
- wherein the touch part is provided at a center thereof with a center touch part and provided with an outer touch part surrounding the center touch part,
- wherein the bottom surface includes a first bottom part on which the center touch part is provided and a second bottom part on which the outer touch part is provided, and
- the first bottom part and the second bottom part are movable relative to each other.

16. A vehicle comprising a touch input apparatus of claim 1, a display apparatus and a control part to operate the display apparatus according to an input signal input into the touch input apparatus.

17. The vehicle of claim 16, wherein the control part converts a gesture input into the touch input apparatus into an input signal, and transmits an operation signal such that an operation supported by the input signal is displayed on the display apparatus.

18. The vehicle of claim 16, having the touch input apparatus installed on a gear box.

* * * * *